(12) United States Patent
Park et al.

(10) Patent No.: US 7,016,321 B1
(45) Date of Patent: Mar. 21, 2006

(54) METHOD FOR PROCESSING HANDOFF AND CALL IN ASYNCHRONOUS MOBILE COMMUNICATION SYSTEM

(75) Inventors: Jae-Hong Park, Ichon-shi (KR); Woon-Hee Hwang, Ichon-shi (KR); Yeon-Sang Koo, Ichon-shi (KR); Chong-Won Lee, Ichon-shi (KR); Shin-Hyun Yang, Ichon-shi (KR); Jeong-Hwa Ye, Ichon-shi (KR)

(73) Assignee: UTStarcom, Inc., Alameda, CA (US)

( * ) Notice: Subject to any disclaimer, the term of this patent is extended or adjusted under 35 U.S.C. 154(b) by 829 days.

(21) Appl. No.: 09/659,900

(22) Filed: Sep. 13, 2000

(30) Foreign Application Priority Data

Sep. 14, 1999 (KR) ............................ 1999-39433

(51) Int. Cl.
*H04Q 7/00* (2006.01)

(52) U.S. Cl. .................. 370/331; 370/230; 370/328; 370/329; 370/338; 370/340; 370/341; 370/465; 370/467

(58) Field of Classification Search ............ 370/230, 370/328, 329, 331, 338, 340, 341, 465, 467
See application file for complete search history.

(56) References Cited

U.S. PATENT DOCUMENTS

| | | | |
|---|---|---|---|
| 5,590,133 A * | 12/1996 | Billstrom et al. | 370/349 |
| 5,664,004 A | 9/1997 | Durchman et al. | 455/466 |
| 5,697,055 A | 12/1997 | Gilhousen et al. | 455/33.1 |
| 5,729,536 A * | 3/1998 | Doshi et al. | 370/398 |
| 5,850,391 A * | 12/1998 | Essigmann | 370/331 |
| 5,862,481 A | 1/1999 | Kulkarni et al. | 455/432 |
| 5,884,177 A | 3/1999 | Hanley | 455/439 |
| 5,901,354 A | 5/1999 | Menich et al. | 455/442 |
| 5,918,177 A * | 6/1999 | Corriveau et al. | 455/432.3 |
| 5,936,948 A * | 8/1999 | Sicher | 370/314 |
| 6,035,199 A | 3/2000 | Barnett | 455/448 |
| 6,108,550 A * | 8/2000 | Wiorek et al. | 455/447 |
| 6,134,433 A * | 10/2000 | Joong et al. | 455/417 |
| 6,463,054 B1 * | 10/2002 | Mazur et al. | 370/352 |
| 6,463,055 B1 * | 10/2002 | Lupien et al. | 370/353 |
| 6,519,456 B1 * | 2/2003 | Antonio et al. | 455/442 |

(Continued)

FOREIGN PATENT DOCUMENTS

WO    WO 9731503    8/1997

OTHER PUBLICATIONS

"A Subscriber Signalling Gateway Between CDMA Mobile Station and GSM Mobile Switching Center" by Tscha y et al.; International Conference on Universal Communications, 1993, IEEE, New York, NY, U.S. vol. 1, pp. 181-185.

(Continued)

*Primary Examiner*—Wellington Chin
*Assistant Examiner*—Kevin Mew
(74) *Attorney, Agent, or Firm*—McDonnell Boehnen Hulbert & Berghoff LLP

(57) ABSTRACT

A method for processing a call in an asynchronous mobile communication system including an asynchronous mobile station, an asynchronous radio network, wherein a synchronous core network is interlocked, includes the steps of: setting up the call in case a calling call message is generated in the mobile station; establishing a channel between the asynchronous mobile station and the asynchronous radio network; handling basic information for assigning a radio resource; performing a cipher establishment; establishing the radio resource; performing a configuration for a service; and transmitting a phone call stand-by message to a user.

21 Claims, 25 Drawing Sheets

U.S. PATENT DOCUMENTS

| | | | |
|---|---|---|---|
| 6,570,856 B1 * | 5/2003 | Freeburg et al. | 370/310.1 |
| 6,680,953 B1 * | 1/2004 | Kim | 370/467 |
| 6,826,406 B1 * | 11/2004 | Vialen et al. | 455/450 |
| 2002/0071480 A1 * | 6/2002 | Marjelund et al. | |

OTHER PUBLICATIONS

ETSI EN 300 940 V6.3.1, XP-002210743: "Digital Cellular Telecommunications System (Phase 2+); Mobile radio interface layer 3 specification" (GSM 04.08 version 6.3.1 Release 1997).

ETSI EN 300 940 V6.3.1 (Aug. 1999), XP-002210417, Digital cellular telecommunications system (Phase 2+); Mobile radio interface layer 3 specification (GSM 04.08 version 6.3.1 Release 1997).

ETS 300 590, XP-002120583, "Digital cellular telecommunications system (Phase 2); Mobile-services Switching Centre—Base Station System" (MSE—BSS) interface, Layer 3 specification (GSM 08.08).

Tscha Y., et al., "A Subscriber Signalling Gateway Between CSMA Mobile Station and GSM Motile Switching Center", XP 002031666.

Redl, S. et al., "An Introduction to GSM", XP-002199834.

* cited by examiner

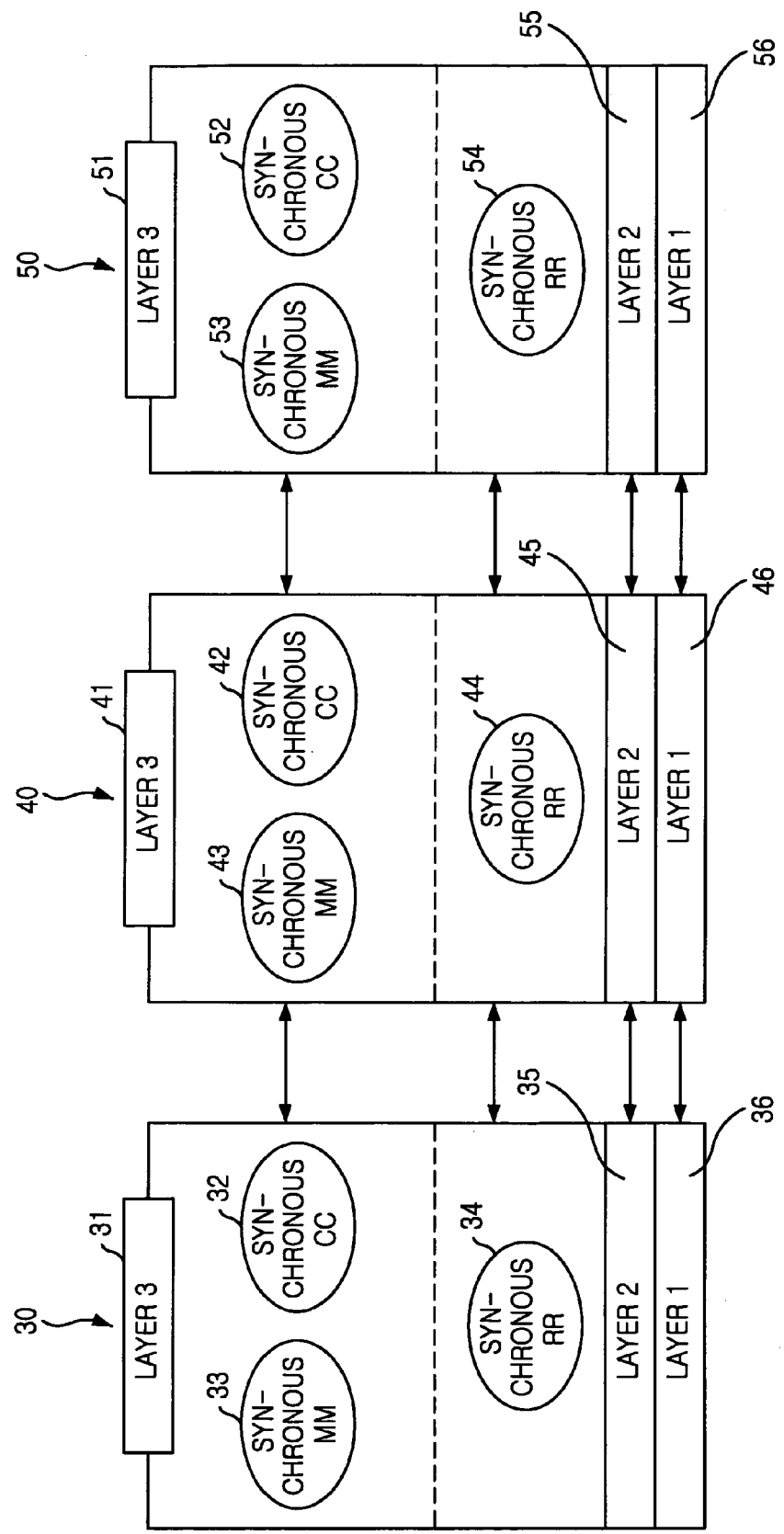

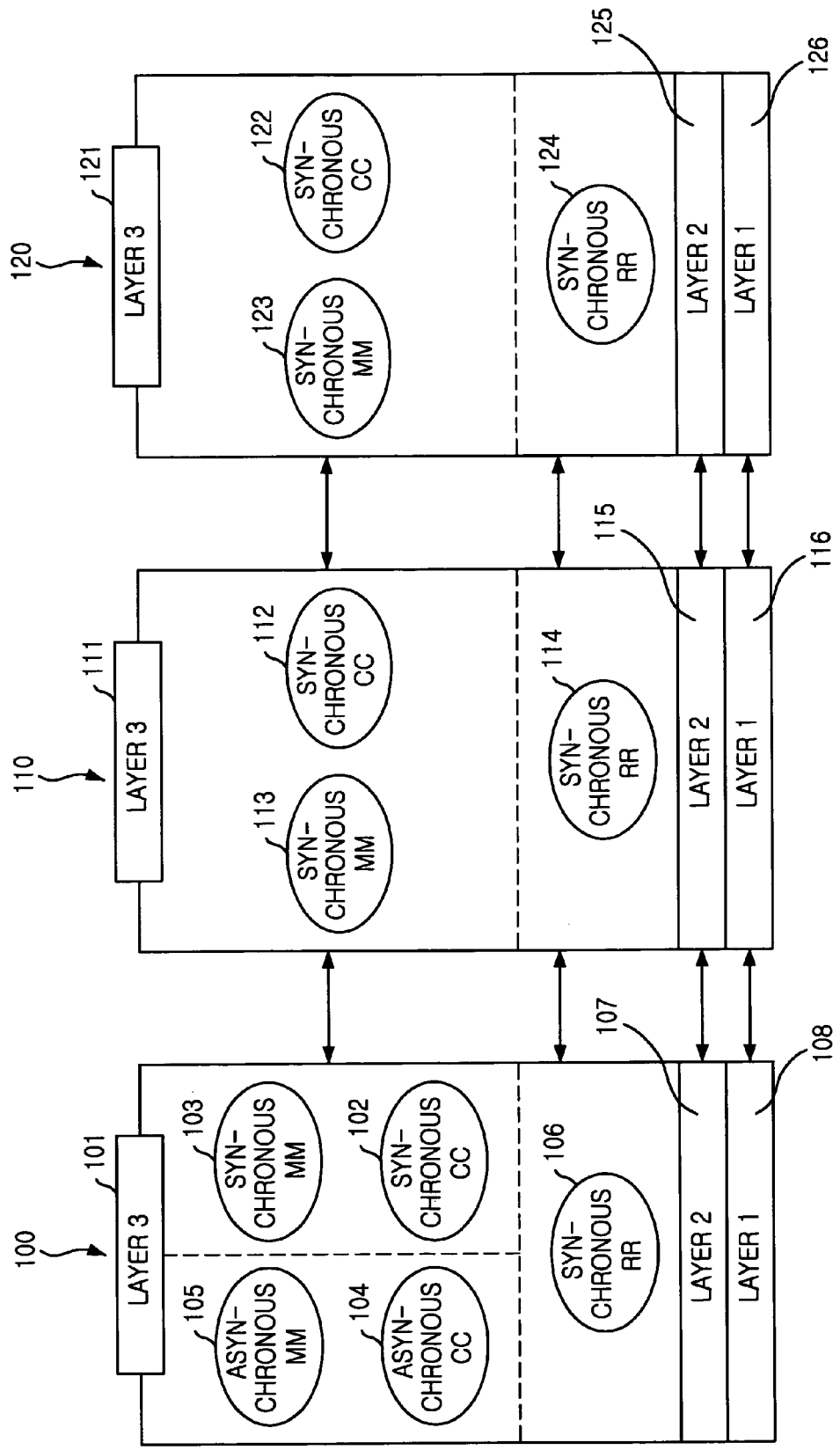

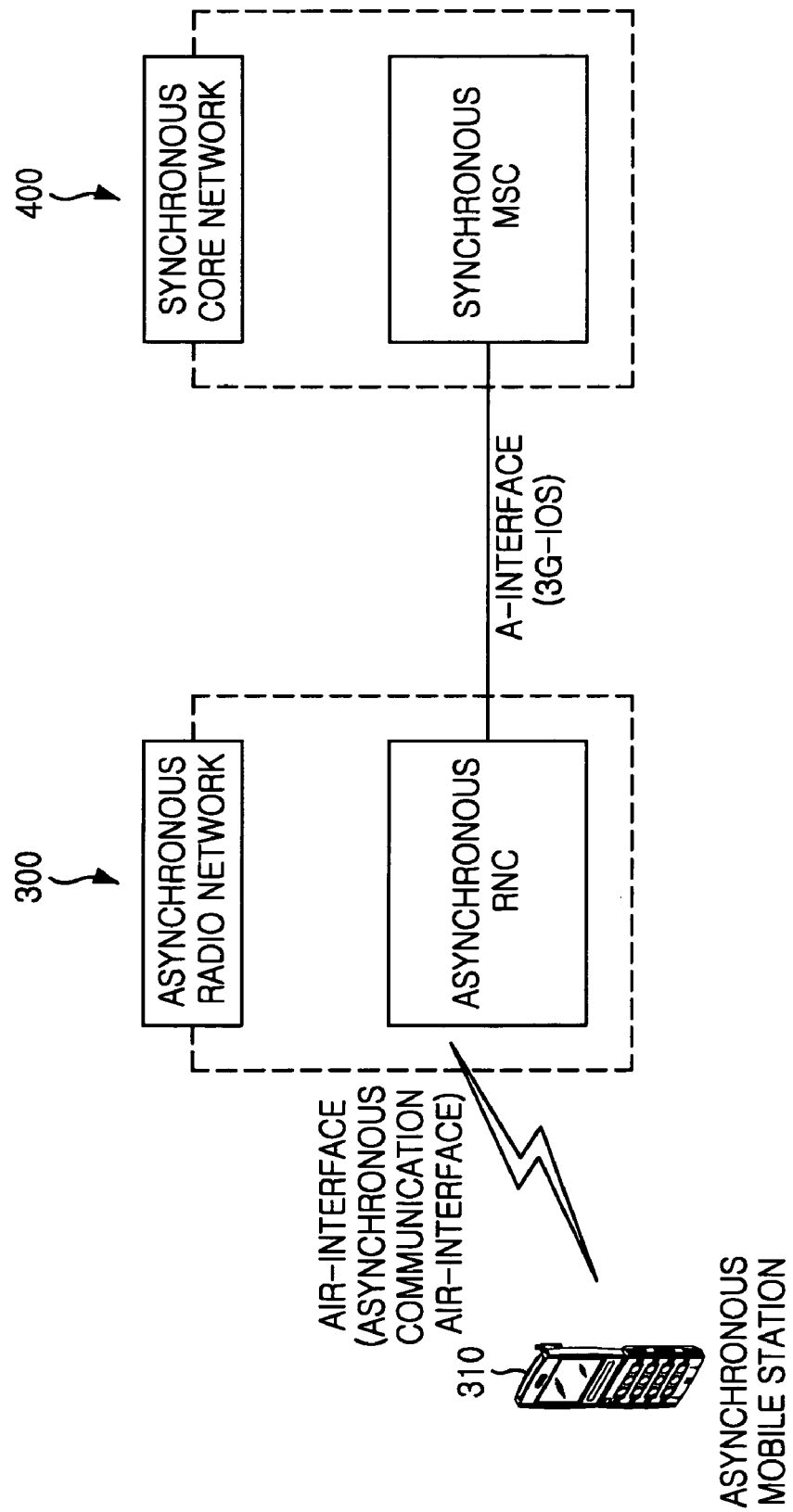

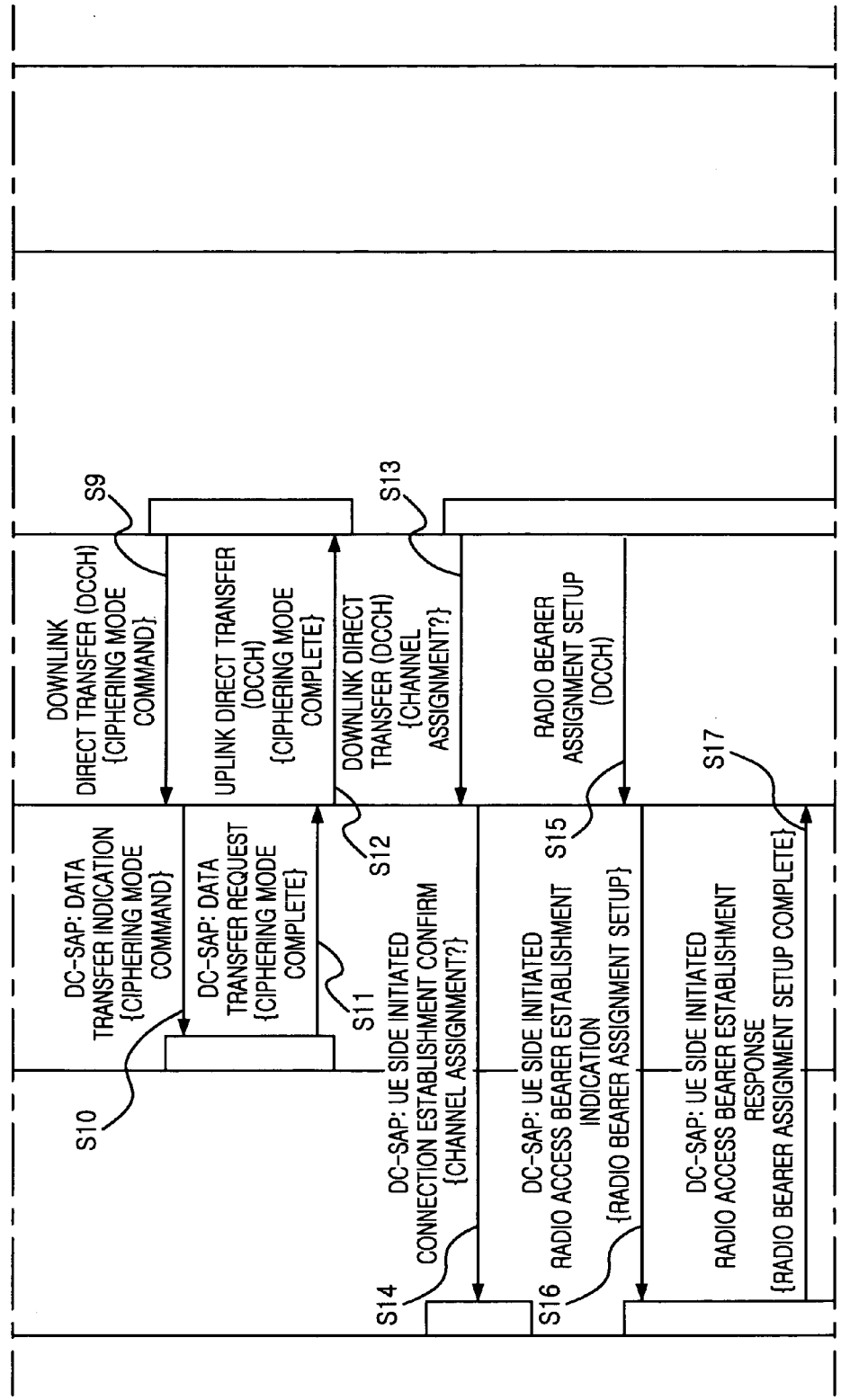

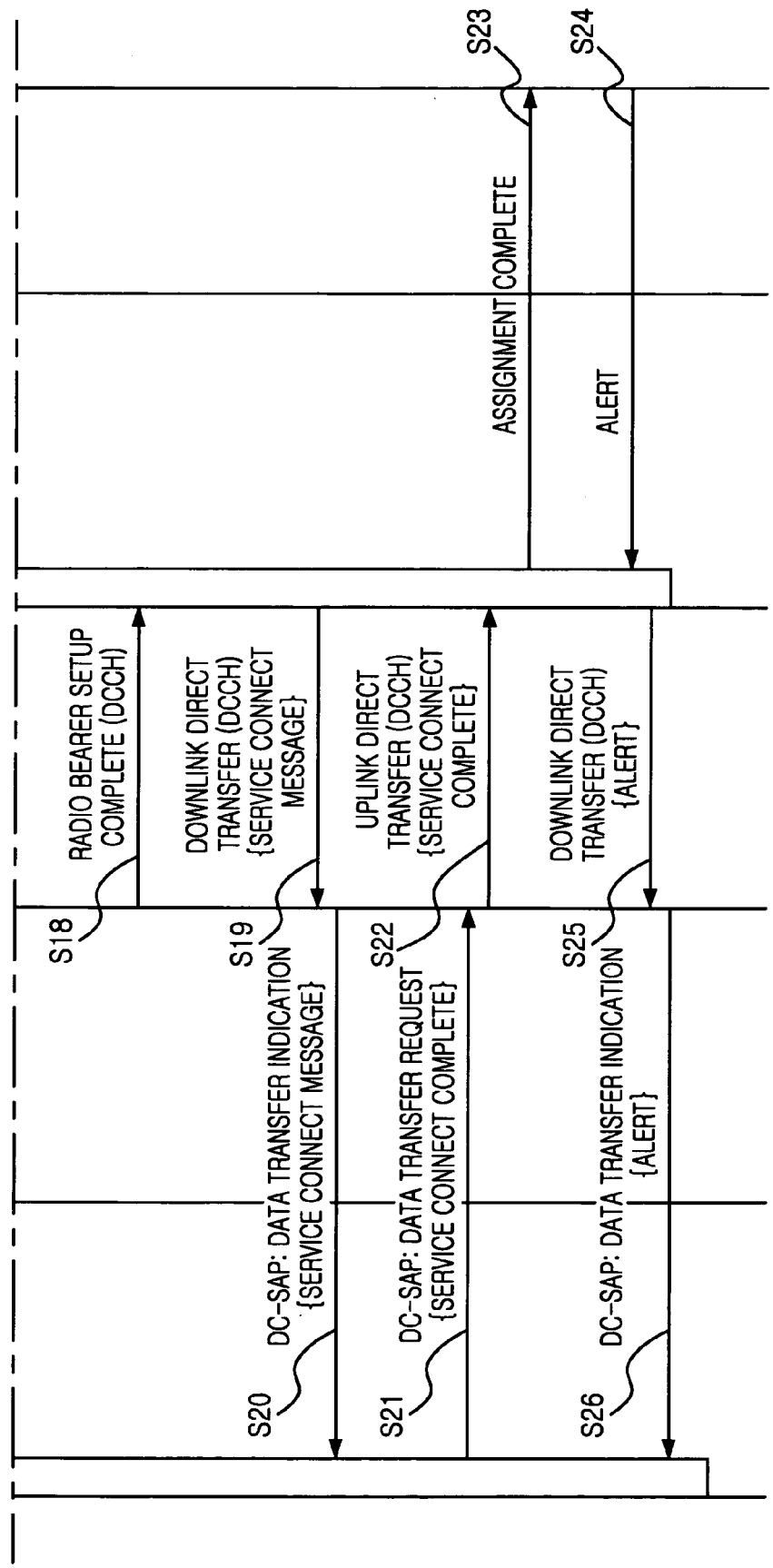

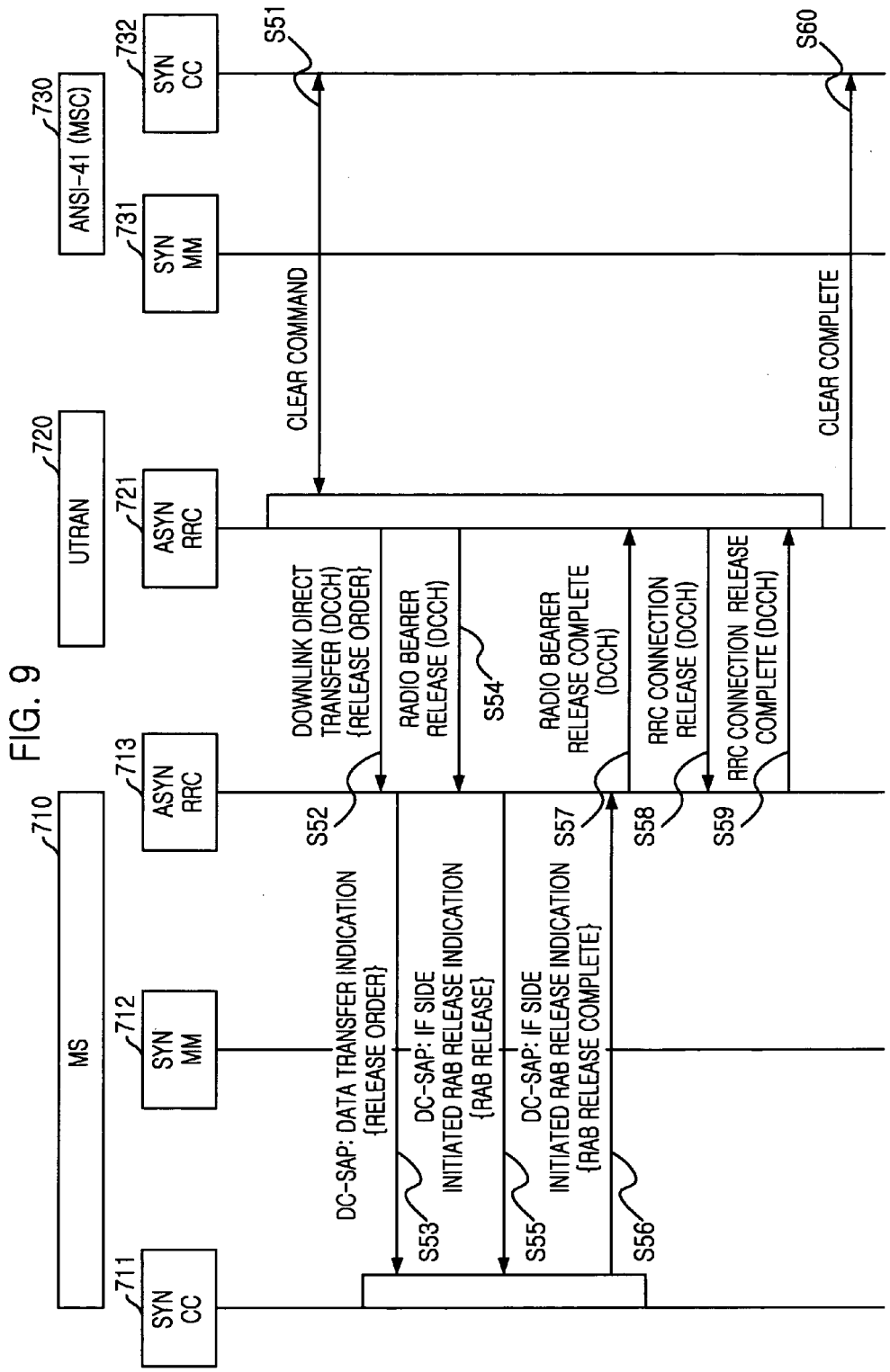

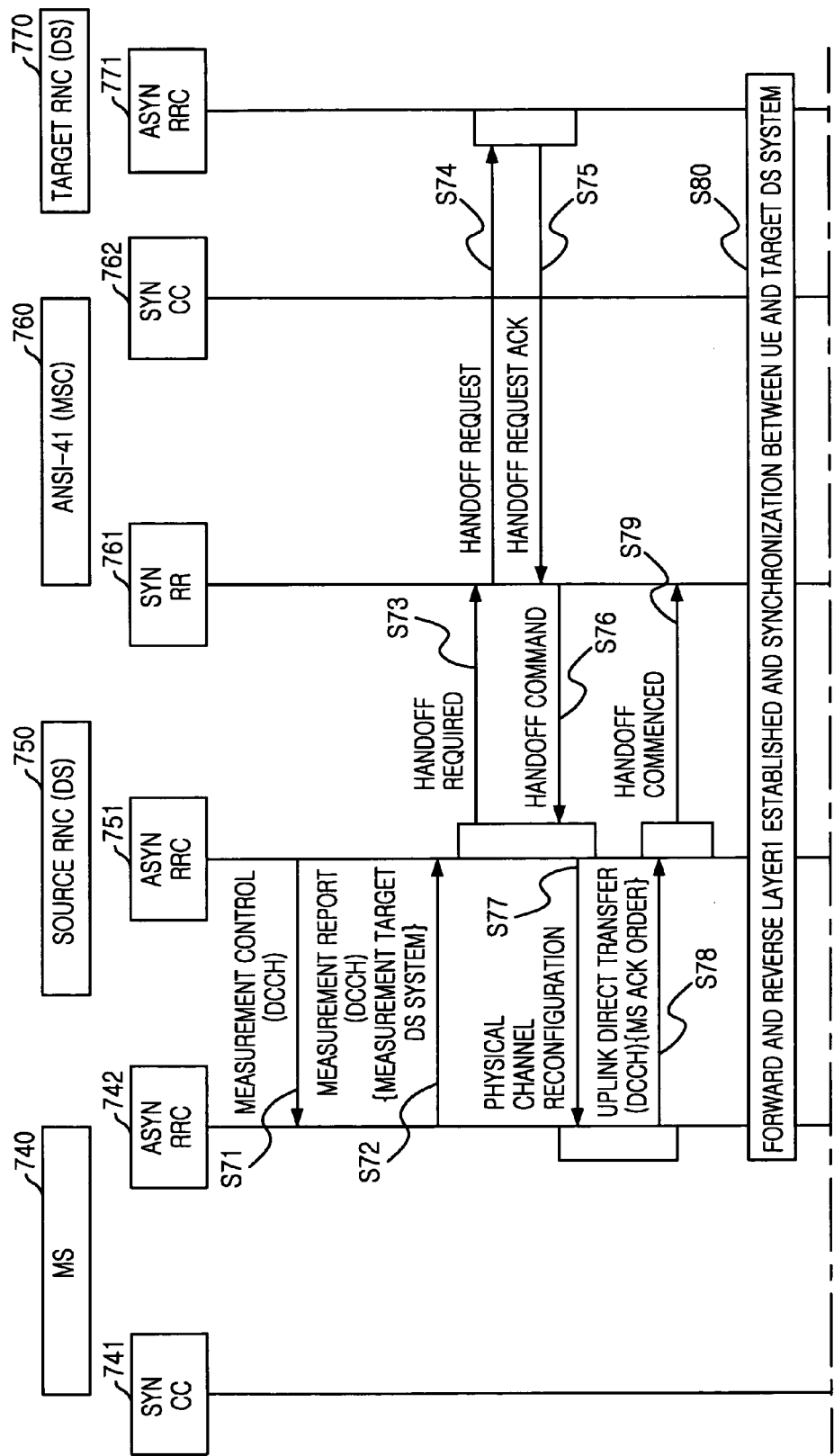

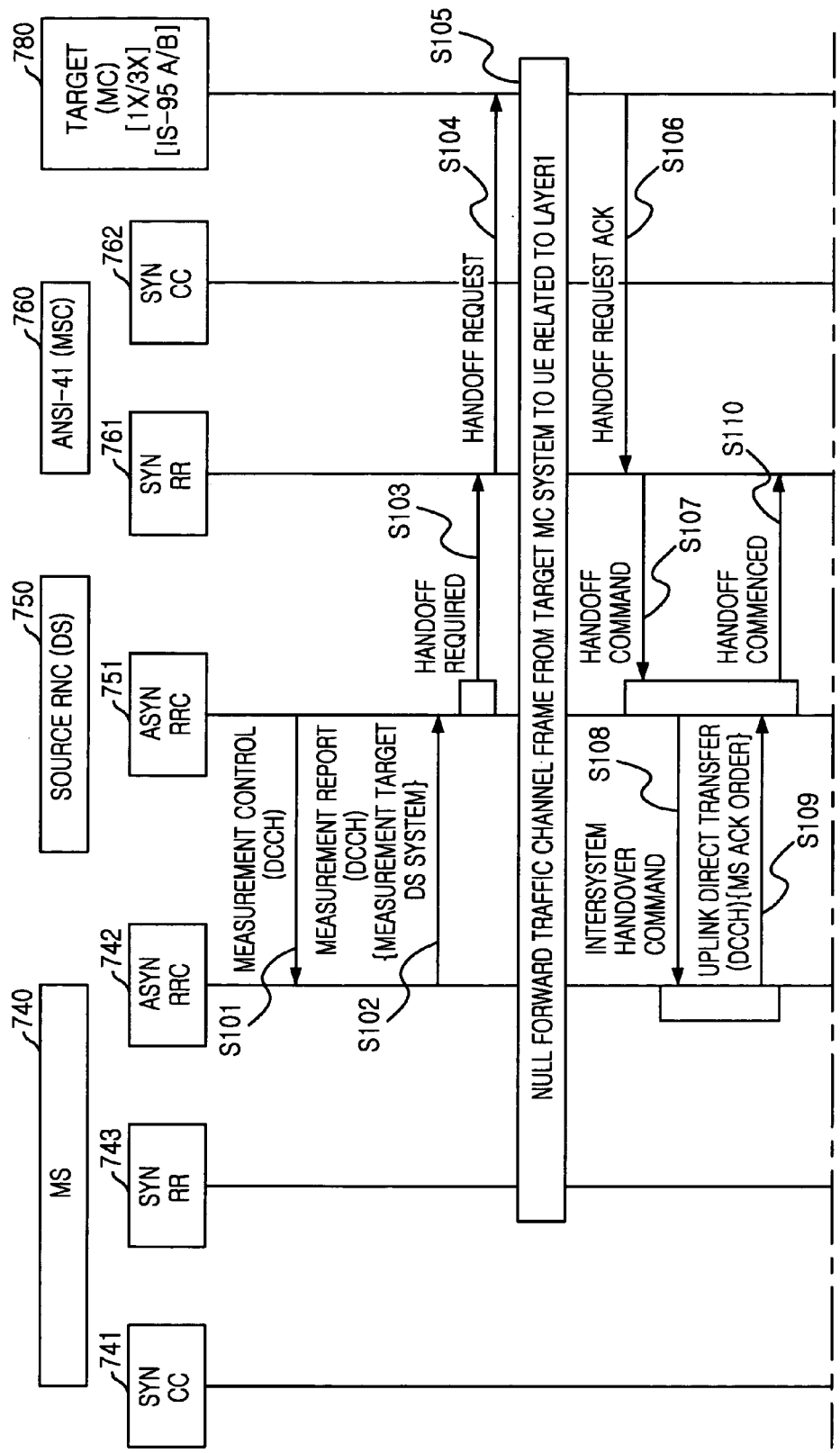

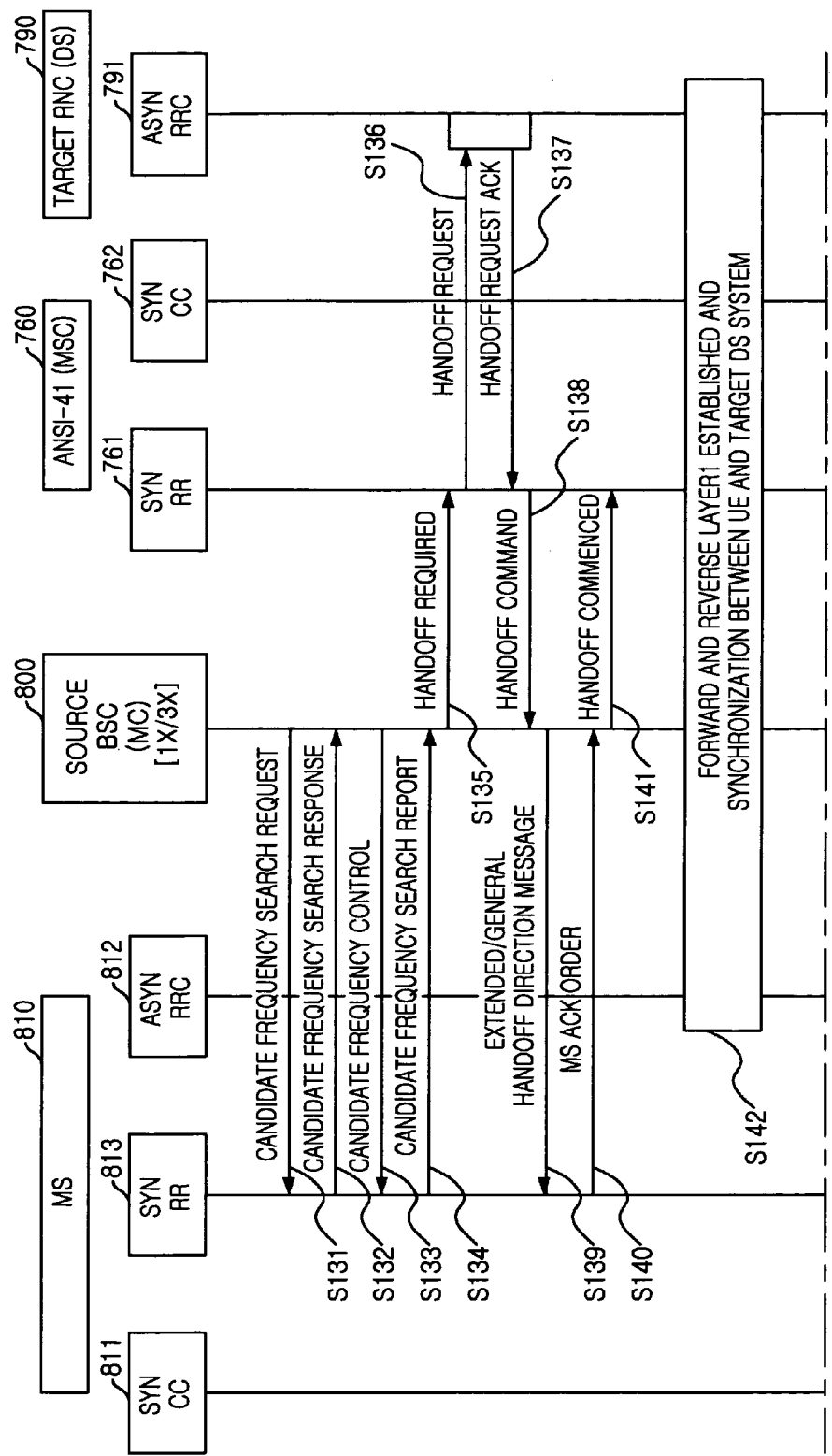

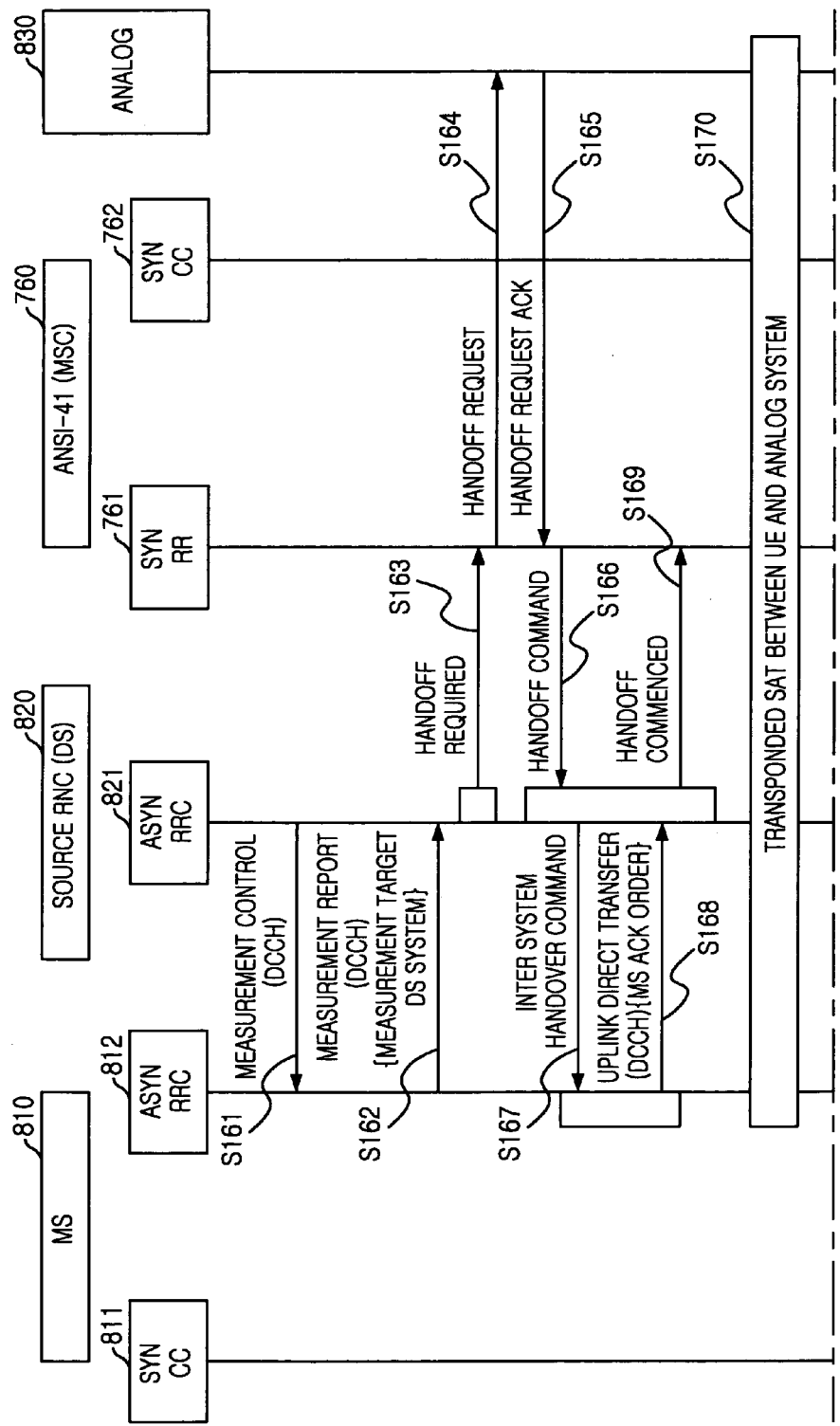

METHOD FOR PROCESSING HANDOFF AND CALL IN ASYNCHRONOUS MOBILE COMMUNICATION SYSTEM

FIELD OF THE INVENTION

This invention relates to a method for processing a handoff and a call in an asynchronous mobile communication system, accented in an International Mobile Telecommunication-2000 (IMT-2000) system; and, more particularly, to a method for processing the handoff and the call in the asynchronous mobile communication system coupled to a synchronous core network.

DESCRIPTION OF THE PRIOR ART

In a conventional synchronous mobile communication system, a synchronous radio network, for example; a code division multiple access-2000 (CDMA-2000) radio network, is coupled to a synchronous mobile station and a synchronous core network (CN).

Also, in a conventional asynchronous mobile communication system, an asynchronous radio network, for example, an universal mobile telecommunication system (UMTS) Terrestrial Radio Access Network (UTRAN) is coupled to an asynchronous mobile station and an asynchronous core network. FIG. 1 shows core network interface architectures of the conventional synchronous/asynchronous mobile communication system as mentioned above.

FIG. 1A shows the core network interface architecture of the conventional synchronous mobile communication system. In this drawing, the reference numeral 11 denotes a synchronous mobile station, 12 denotes a synchronous radio network (i.e., a code division multiple access-2000 (CDMA-2000) radio network) which performs a data interfacing operation with the synchronous mobile station 11 and includes a synchronous base transceiver station/base station controller (BTS/BSC), and 13 denotes a synchronous core network which is connected to the synchronous radio network 12 and includes a synchronous mobile services switching center (MSC).

In the above core network interface architecture of the conventional synchronous mobile communication system, the synchronous mobile station 11 can be connected to only the synchronous radio network 12 as well known to one skilled in the art, which is in turn connected to the synchronous core network 13, thereby allowing the synchronous mobile station 11 to be interfaced with only the synchronous core network 13.

FIG. 1B shows the core network interface architecture of the conventional asynchronous mobile communication system. In this drawing, the reference numeral 21 denotes an asynchronous mobile station, 22 denotes an asynchronous radio network (i.e., a UTRAN) which includes a base transceiver station (BTS) and a radio network controller (RNC), and 23 denotes an asynchronous core network which includes an asynchronous mobile services switching center (MSC) connected to the UTRAN 22.

In the above core network interface architecture of the conventional asynchronous mobile communication system, the asynchronous mobile station 21 is connected to the asynchronous radio network 22 (i.e., UTRAN) which is in turn connected to the asynchronous core network 23, thereby allowing the asynchronous mobile station 21 to perform a data interfacing operation with the asynchronous core network 23.

FIG. 2 shows layered protocol structures of the conventional synchronous/asynchronous mobile communication system as mentioned above.

FIG. 2A shows the layered protocol structure of the conventional synchronous mobile communication system. In this drawing, the reference numeral 30 denotes a synchronous mobile station, 40 a synchronous radio network and 50 a synchronous core network connected to the synchronous radio network 40.

The synchronous mobile station 30 comprises a layer 3 31, a layer 2 35 and a layer 1 36. The layer 3 31 includes a synchronous call control (CC) entity 32 for management of a call and a synchronous mobility management (MM) entity 33 for management of a mobility.

The layer 3 31 is a network layer which includes the following sub layers: a synchronous radio resource (RR) sub layer 34, a synchronous call control (CC) entity 32 and a mobility management (MM) entity 33. In synchronous systems, the synchronous RR sub layer 34 is not apparently separated from the others in the layer 3 31.

The RR sub layer 34 offers data transfer services on primitives to a lower layer (RLC sub layer) and handles control plane signaling of the layer 3 31 between a mobile station (MS) and a synchronous radio network. The RR sub layer 34 manages a radio resource. Also, the RR sub layer 34 assigns/re-configures/releases the radio resource to UE/UTRAN.

The CC entity 32 handles layer call control signaling between the MSs and the synchronous radio network.

The MM entity 33 handles layer 3 mobility management signaling of layer 3 between the MSs and the synchronous radio network.

The layers 3 to 1 31, 35 and 36 in the synchronous mobile station 30 communicate with corresponding layers 41, 45 and 46 in the synchronous radio network 40.

The synchronous radio network 40 comprises a layer 3 41, a layer 2 45 and a layer 1 46. The layers 3 to 1 in the synchronous radio network 40 correspond respectively to those in the synchronous mobile station 30.

The layers 3 to 1 41, 45 and 46 in the synchronous radio network 40 communicate with corresponding layers 31, 35, 36, 51, 55 and 56 in the synchronous mobile station and the synchronous core network 50.

The synchronous core network 50 comprises a layer 3 51, a layer 2 55 and a layer 1 56. The layers 3 to 1 in the synchronous radio network 50 correspond respectively to those in the synchronous mobile station 30. The layers 3 to 1 51, 55 and 56 in the synchronous core network 50 communicate with corresponding layers 41, 45 and 46 in the synchronous radio network 40.

In the conventional synchronous mobile station and radio network as the layered protocol structure, the synchronous mobile station 30 receives a Sync channel message from the synchronous radio network 40 over a Sync channel and acquires information necessary to its connection to the synchronous core network 50, including information related to the synchronous core network 50 and information about the synchronous radio network 40, from the received Sync channel message.

In other words, for interfacing with the synchronous ANSI-41 network via the synchronous radio network, the synchronous mobile station acquires system information (i.e., information related to the radio network and core network) through a system determination sub-state, a pilot channel acquisition sub-state, a Sync channel acquisition sub-state and a timing changing sub-state after it is powered on.

FIG. 2B shows the layered protocol structure of the conventional asynchronous mobile communication system. In this drawing, the reference numeral 60 denotes an asynchronous mobile station, 70 a UTRAN and 80 an asynchronous core network.

The asynchronous mobile station 60 comprises a layer 3 61, a layer 2 65 and a layer 1 66. In particular, the layer 3 61 includes a non-access stratum (NAS) part and an access stratum (AS) part. The NAS part includes an asynchronous call control (CC) part 62 for management of a call and an asynchronous mobility management (MM) part 63 for management of a mobility. The AS part includes an asynchronous radio resource control (RRC) part 64. In the asynchronous system, the asynchronous RRC sub layer is apparently separated from the NAS part. Functions of the asynchronous RRC sub layer are the same as those of the synchronous RR sub layer.

The UTRAN 70 comprises a layer 3 71, a layer 2 73 and a layer 1 74. The layer 3 71 of the UTRAN 70 has no NAS part having asynchronous CC part and asynchronous MM part. The layers 3 to 1 of the UTRAN 70 are connected and correspond respectively to those in the asynchronous mobile station 60 and those in the asynchronous core network 80. However, since the UTRAN 70 does not have the NAS part, i.e., the asynchronous CC part and the asynchronous MM part, the NAS parts of the asynchronous mobile station 60 and the asynchronous core network 80 are coupled to each other not through the UTRAN 70.

The asynchronous core network 80 comprises a layer 3 81 having an NAS part connected to that of the asynchronous mobile station 60 and an AS part, a layer 2 85 and a layer 1 86 connected respectively to those in the UTRAN 70. The NAS part comprises an asynchronous CC part 82 for management of a call and an asynchronous MM part 83 for management of a mobility.

Functions of the layer 3 to 1 of the asynchronous system are similar with those of the synchronous system except for an operating type. Therefore, detailed description of the layer 3 to 1 will be skipped.

The more detailed descriptions about layered protocol structures are well taught in $3^{rd}$ Generation Partnership Project (3GPP), Technical Specification Group (TSG)—Radio Access Network (RAN): 3G TS25.301 (Radio Interface Protocol Architecture), 3G TS25.302 (Services provided by the physical layer), 3G TS25.321 (MAC Protocol Specification), 3G TS25.322 (RLC Protocol Specification) and 3G TS25.331 (RRC Protocol Specification) in detail.

In the conventional asynchronous mobile station and radio network having the layered protocol structure, the asynchronous mobile station 60 receives a system information message from the UTRAN 70 over a broadcast control channel (BCCH) and acquires information necessary to its connection to the asynchronous core network 80, including information related to the asynchronous core network 80 and information about the UTRAN 70, from the received system information message.

In the next-generation mobile telecommunication system such as the IMT-2000 system, either the GSM-MAP network used in the above conventional asynchronous mobile communication system or the ANSI-41 network used in the above conventional synchronous mobile communication system should be employed as a core network in order to perform international roaming in a synchronous or asynchronous mobile communication system of an IMT-2000 system.

According to network deployment scenarios, the IMT-2000 system can have the following four interface architectures; first: synchronous mobile station—synchronous radio network—synchronous ANSI-41 network, second: synchronous mobile station—synchronous radio network—asynchronous GSM-MAP network, third: asynchronous mobile station—asynchronous radio network—synchronous ANSI-41 network and fourth: asynchronous mobile station—asynchronous radio network—asynchronous GSM-MAP network.

FIG. 3 shows core network interface architectures of the next-generation mobile communication system such as the IMT-2000 system.

FIG. 3A shows a synchronous ANSI-41 core network interface architecture of a hybrid type synchronous radio network. In this drawing, the reference numeral 100 denotes a hybrid type synchronous mobile station, 110 a hybrid type synchronous radio network, and 120 a synchronous core network which includes a synchronous mobile services switching center (MSC).

FIG. 3B shows an asynchronous GSM-MAP core network interface architecture of the hybrid type synchronous radio network. In this drawing, the reference numeral 100 denotes a hybrid type synchronous mobile station, 110 a hybrid type synchronous radio network, and 130 an asynchronous core network which includes an asynchronous MSC.

FIG. 3C shows an asynchronous GSM-MAP core network interface architecture of a hybrid type asynchronous radio network. In this drawing, the reference numeral 210 denotes a hybrid type asynchronous mobile station, 220 denotes a hybrid type UTRAN which is a hybrid type asynchronous radio network, and 230 denotes an asynchronous core network which is connected to the hybrid type UTRAN 220 and includes an asynchronous MSC.

FIG. 3D shows a synchronous ANSI-41 core network interface architecture of the hybrid type asynchronous radio network. In this drawing, the reference numeral 210 denotes a hybrid type asynchronous mobile station, 220 denotes a hybrid type UTRAN which is a hybrid type asynchronous radio network, and 240 denotes a synchronous core network which is connected to the hybrid type UTRAN 220 and includes a synchronous MSC.

In order to be operable adaptively to the above four interface architectures, each of the hybrid type synchronous and asynchronous mobile stations in the next-generation mobile communication system has both asynchronous CC and MM protocol entities serving for the GSM-MAP core network and synchronous CC and MM protocol entities serving for the ANSI-41 core network at the layer 3 in the protocol stack structure, which is a different from each of the conventional synchronous and asynchronous mobile stations.

FIG. 4 shows layered protocol structures of the next-generation mobile communication system.

FIG. 4A shows the layered protocol structure of a hybrid type synchronous mobile station, a hybrid type synchronous radio network and the synchronous ANSI-41 core network. In this drawing, the reference numeral 100 denotes a hybrid type synchronous mobile station, 110 denotes a hybrid type synchronous radio network, and 120 denotes an ANSI-41 core network which is a synchronous core network connected to the hybrid type synchronous radio network 110.

The hybrid type synchronous mobile station 100 comprises a layer 3 101, a layer 2 107 and a layer 1 108. The layer 3 101 comprises a synchronous CC part 102, a synchronous MM part 103, an asynchronous CC part 104, an asynchronous MM part 105 and a synchronous radio resource part 106. The hybrid type synchronous mobile station 100 selectively makes a CC/MM protocol active according to a core network operating type. Information for identifying the core network operating type is given to the hybrid type synchronous mobile station 100.

For example, if the hybrid type synchronous mobile station 100 is currently connected to the ANSI-41 core network 120, the layer 3 101 therein activates protocols of the synchronous CC part 102 and synchronous MM part 103 to perform a message interfacing operation with the ANSI-41 core network 120.

The hybrid type synchronous radio network 110 comprises a layer 3 111, a layer 2 115 and a layer 1 116, which activates their protocols corresponding respectively to those in the hybrid type synchronous mobile station 100 and those in the ANSI-41 core network 120 to transmit and receive messages. The layer 3 111 includes a synchronous CC part 112, a synchronous MM part 113 and a synchronous RR part 114.

The ANSI-41 core network 120 comprises a layer 3 121, a layer 2 125 and a layer 1 126. The layer 3 121 comprises a synchronous CC part 122, a synchronous MM part 123 and a synchronous RR part 124.

In FIG. 4B, the reference numeral 100 denotes a hybrid type synchronous mobile station, 110 denotes a hybrid type synchronous radio network, and 130 denotes a GSM-MAP core network which is an asynchronous core network.

The hybrid type synchronous mobile station 100 comprises a layer 3 101 having a NAS part and an AS part, a layer 2 107 and a layer 1 108. The NAS part includes a synchronous CC part 102, a synchronous MM part 103, an asynchronous CC part 104 and an asynchronous MM part 105. The AS part includes a synchronous RR part 106. The hybrid type synchronous mobile station 100 selectively makes a CC/MM protocol active according to a core network operating type.

For example, if the hybrid type synchronous mobile station 100 is currently connected to the GSM-MAP core network 130, the layer 3 101 therein activates protocols of the asynchronous CC part 104 and asynchronous MM part 105 to perform a message interfacing operation with the GSM-MAP core network 130.

The hybrid type synchronous radio network 110 comprises a layer 3 111 having a NAS part and an AS part, a layer 2 115 and a layer 1 116, which activate their protocols corresponding respectively to those in the hybrid type synchronous mobile station 100 and those in the GSM-MAP core network 130 to transmit and receive messages.

The GSM-MAP core network 130 comprises a layer 3 131 having a NAS part and an AS part, a layer 2 135 and a layer 1 136. The NAS part includes an asynchronous CC part 132 and an asynchronous MM part 133. The AS part includes an asynchronous RRC part 134.

The layers 3 to 1 of the hybrid type synchronous radio network 110 are connected and correspond respectively to those in the hybrid type synchronous mobile station 100 and those in the asynchronous core network 130. However, the NAS parts of the hybrid type asynchronous mobile station 100 and the asynchronous core network 130 are coupled to each other not through the hybrid type synchronous mobile station 110.

FIG. 4C shows layered protocol structures of a hybrid type asynchronous mobile station, a hybrid type asynchronous radio network and a synchronous ANSI-41 core network. In this drawing, the reference numeral 210 denotes a hybrid type asynchronous mobile station, 220 denotes a hybrid type UTRAN which is a hybrid type asynchronous radio network, and 230 denotes an ANSI-41 core network connected to the hybrid type UTRAN 220.

The hybrid type asynchronous mobile station 210 comprises a layer 3 211, a layer 2 217 and a layer 1 218. The layer 1 includes a synchronous CC part 212, a synchronous MM part 213, an asynchronous CC part 214, an asynchronous MM part 215 and asynchronous RRC part 216 and selectively activates a synchronous CC/MM protocol or an asynchronous CC/MM protocol.

For example, if the hybrid type asynchronous mobile station 210 is currently connected to the ANSI-41 core network 230, the layer 1 therein activates a protocol between the synchronous CC part 212 and synchronous MM part 213 to perform a message interfacing operation with the ANSI-41 core network 230.

FIG. 4D shows layered protocol structures of a hybrid type asynchronous mobile station, a hybrid type asynchronous radio network and an asynchronous GSM-MAP core network. In this drawing, the reference numeral 210 denotes a hybrid type asynchronous mobile station, 220 denotes a hybrid type UTRAN which is a hybrid type asynchronous radio network, and 240 denotes an asynchronous GSM-MAP core network connected to the hybrid type UTRAN 220.

The hybrid type asynchronous mobile station 210 comprises a layer 3 211 having a NAS part and an AS part, a layer 2 217 and a layer 1 218. The NAS part includes a synchronous CC part 212, a synchronous MM part 213, an asynchronous CC part 214 and an asynchronous MM part 215 and selectively activates a synchronous CC/MM protocol or an asynchronous CC/MM protocol. The AS part includes an asynchronous RRC part 216.

The hybrid type asynchronous radio network 220 comprises a layer 3 221 having a NAS part and an AS part, a layer 2 225 and a layer 1 226, which activate their protocols corresponding respectively to those in the hybrid type asynchronous mobile station 210 and those in the GSM-MAP core network 240 to transmit and receive messages.

The GSM-MAP core network 240 comprises a layer 3 241 having a NAS part and an AS part, a layer 2 245 and a layer 1 246. The NAS part includes an asynchronous CC part 242 and an asynchronous MM part 243. The AS part includes an asynchronous RRC part 244.

For example, if the hybrid type asynchronous mobile station 210 is currently connected to the GSM-MAP core network 240, the NAS part therein activates protocols of the asynchronous CC part 214 and asynchronous MM part 215 to perform a message interfacing operation with the GSM-MAP core network 240.

The layers 3 to 1 of the hybrid type asynchronous radio network 220 are connected and correspond respectively to those in the hybrid type asynchronous mobile station 210 and those in the asynchronous core network 240. However, the NAS parts of the hybrid type asynchronous mobile station 210 and the asynchronous core network 240 are coupled to each other not through the hybrid type asynchronous mobile station 220.

As described above, IMT-2000 system includes four interlocking structures, and thus interface specifications corresponding to each interlocking structure are required. That is, for processing a handoff and a call in the synchronous/asynchronous mobile communication system, an interface protocol of synchronous/asynchronous communication mode is required, respectively.

In the asynchronous mobile communication system, Air-Interface refers to an interface between the synchronous mobile station and the synchronous radio network, and a protocol such a TIA/EIA/IS-2000 is used for the Air-interface. A-Interface refers to an interface between the synchronous radio network and the synchronous ANSI-41 core network, and a protocol such as 3 Generation Interoperability Specification (3G-IOS) is used for the A-interface. Each of TIA/EIA/IS-2000 and 3G-IOS is an international standard communication protocol used for Air-interface and A-interface of the IMT-2000 system of the synchronous communication mode, but is not available for the asynchronous communication mode. When processing a handoff and a call in the conventional synchronous mobile communication system having the above interface, it is required to process the handoff and the call as defined in the international standard synchronous communication protocol, and to mutually exchange messages and parameters defined in the international standard synchronous communication protocol. That is, the message and the parameter defined in the international standard communication protocol TIA/EIA/IS-2000, are mutually exchanged through the A-interface between the synchronous mobile station and the synchronous radio network. And, the A-interface between the synchronous radio network and the ANSI-41 network uses a method for processing a handoff and a call as defined in the international standard communication protocol 3G-IOS. The message and the parameter are mutually exchanged through the A-interface.

In the asynchronous mobile communication system, Air-interface refers to an interface between the asynchronous mobile station and the asynchronous radio network, and a protocol, commonly called, Asynchronous Communication Air-Interface is used between them. A-Interface refers to interface between the asynchronous radio network and the asynchronous GSM-MAP core network, and a protocol such as a Radio Access Network Application Part (RANAP) is used between them. Each of Asynchronous Communication Air-Interface and RANAP is an international standard communication protocol used for the Air-interface and the A-interface of the asynchronous IMT-2000 system, but is not available for the synchronous communication mode.

When processing a handoff and a call in the conventional asynchronous mobile communication system having the above interface, it is required to process the handoff and the call as defined in the international standard asynchronous communication protocol, and to mutually exchange a message and a parameter defined in the international standard asynchronous communication protocol. That is, the message and the parameter defined in the international standard communication protocol Asynchronous Communication Air-Interface are mutually exchanged through Air-interface between the asynchronous mobile station and the asynchronous radio network. And, the A-interface between the asynchronous radio network and the GSM-MAP network uses a method for processing the handoff and the call, as defined in the international standard communication protocol RANAP. The message and the parameter are mutually exchanged through the A-interface.

As can be seen from above, in the asynchronous IMT-2000 system, an international communication protocol defined for the asynchronous communication mode should be used for good processing of the handoff and the call. That is, the international standard communication protocol commonly called Asynchronous Communication Air-Interface should be used for the Air-Interface, and the communication protocol called RANAP should be used for the A-Interface.

However, in cases where the asynchronous mobile station, the asynchronous radio network and the synchronous ANSI-41 core network are coupled to each other, the international communication protocol for the asynchronous communication mode is unusable. In other words, the international communication protocol of Asynchronous Communication Air-Interface should be used for the Air-Interface between the asynchronous mobile station and the asynchronous radio network, and the international communication protocol of 3G-IOS should be used for the A-Interface between the asynchronous radio network and the synchronous core network.

In conclusion, the conventional international communication protocol of the asynchronous communication mode does not take the Air-Interface and A-Interface communication protocol of the synchronous communication mode into consideration.

Thus, the problem is that interlocking is impossible, in case the synchronous ANSI-41 core network is connected to the asynchronous radio network in the asynchronous communication system.

SUMMARY OF THE INVENTION

It is an object of the present invention to provide a method for processing a call and a handoff in an asynchronous mobile communication system including an asynchronous mobile station and an asynchronous radio network in case a synchronous core network is connected to the asynchronous mobile communication system.

In accordance with an aspect of the present invention, there is provided a method for processing a call in an asynchronous mobile communication system including an asynchronous mobile station, an asynchronous radio network, wherein a synchronous core network is interlocked, comprising the steps of: a) setting up the call in case a calling call message is generated in the mobile station; b) establishing a channel between the asynchronous mobile station and the asynchronous radio network; c) handling basic information for assigning a radio resource; d) performing a cipher establishment; e) establishing the radio resource; f) performing a configuration for a service; and g) transmitting a phone call stand-by message to a user.

In accordance with another aspect of the present invention, there is provided a method for processing a handoff in an asynchronous mobile communication system including an asynchronous mobile station, a source asynchronous radio network and a target radio network, wherein a synchronous core network is interlocked, the method comprising the steps of: a) determining to handoff; b) selecting the target radio network for the handoff; c) in response to a handoff request, providing information related to the handoff, thereby completing a preparation for the handoff; d) establishing a connection between the asynchronous mobile station and the target radio network, thereby completing the handoff; and e) disconnecting the communication between the asynchronous mobile station and the source asynchronous radio network.

BRIEF DESCRIPTION OF THE DRAWINGS

Other objects and aspects of the invention will become apparent from the following description of the embodiments with reference to the accompanying drawings, in which:

FIG. 2A is a diagram representing protocol structures of each section in the synchronous mobile communication system;

FIG. 4A is a schematic diagram representing protocol layers structure in the synchronous mobile communication system interlocking with the ANSI-41 core network;

FIG. 6 is a pictorial representation interface protocols in a wired area and a radio area in accordance with the present invention;

FIGS. 7A and 7B are flow diagrams representing a method for processing a call in the asynchronous mobile communication system in accordance with the present invention;

FIG. 9 is a flow diagram representing a method for processing a call clearing, in case the Mobile Switching Center (MSC) of the synchronous core network initiates a call-clearing signal in the asynchronous mobile communication system;

FIGS. 10A and 10B are flow diagrams representing a method for processing a handoff in the asynchronous mobile communication system in accordance with the present invention, wherein a synchronous core network is interlocked with a source asynchronous radio network and a target asynchronous radio network;

FIGS. 11A and 11B are flow diagrams representing a method for processing handoff in the asynchronous mobile communication system in accordance with the present invention, wherein a synchronous core network is interlocked with a source asynchronous radio network and a target synchronous radio network;

FIGS. 12A and 12B are flow diagrams representing a method for processing a handoff in the asynchronous mobile communication system, wherein a synchronous core network is interlocked with a source synchronous radio network and a target asynchronous radio network; and FIGS. 13A and 13B are flow diagrams representing a method for processing a handoff in the asynchronous mobile communication system in accordance with the present invention, wherein a synchronous core network is interlocked with a source asynchronous radio network and an analog radio network.

DETAILED DESCRIPTION OF THE PREFERRED EMBODIMENTS

Hereinafter, preferred embodiments in accordance with the present invention will be described hereinafter in detail referring to the accompanying drawings.

Figure 1A:
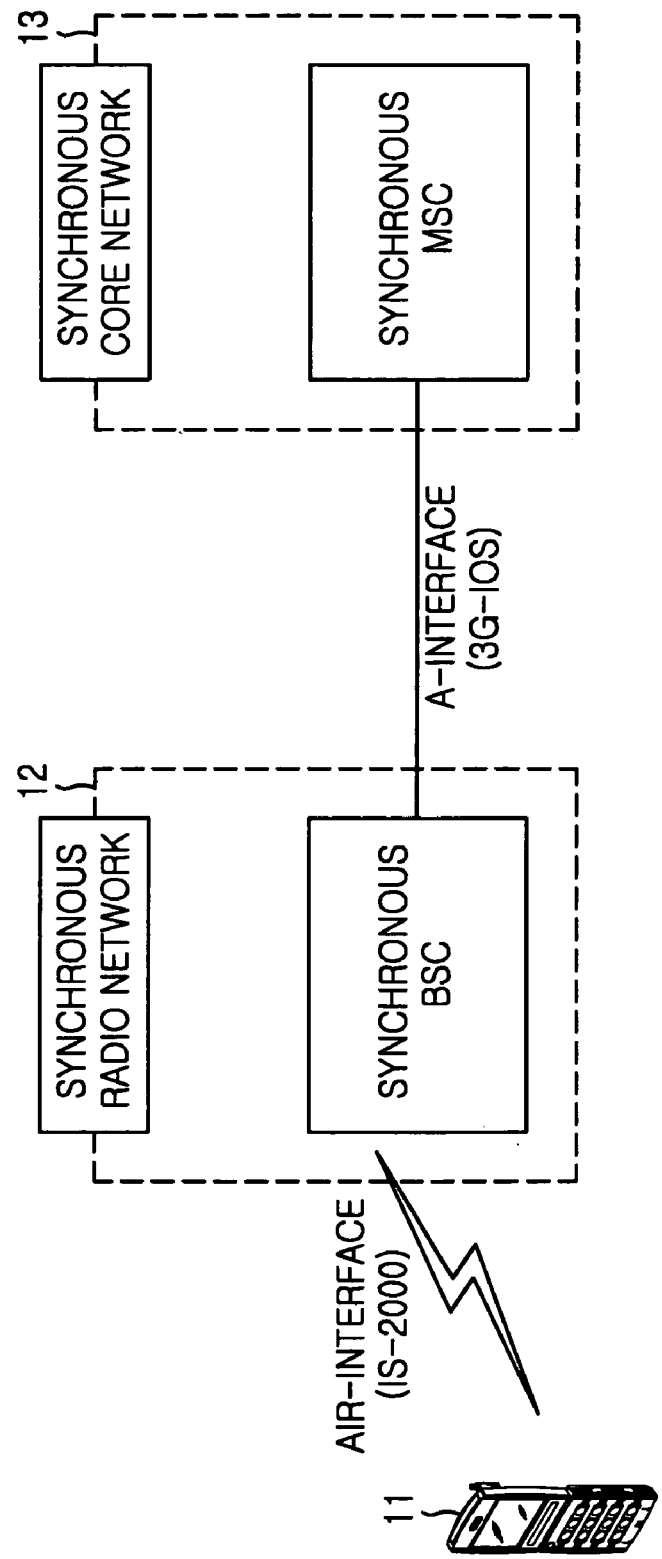
FIG. 1A is a pictorial representation illustrating a conventional structure of a synchronous mobile communication system interlocking with a synchronous core network.
Figure 1B:
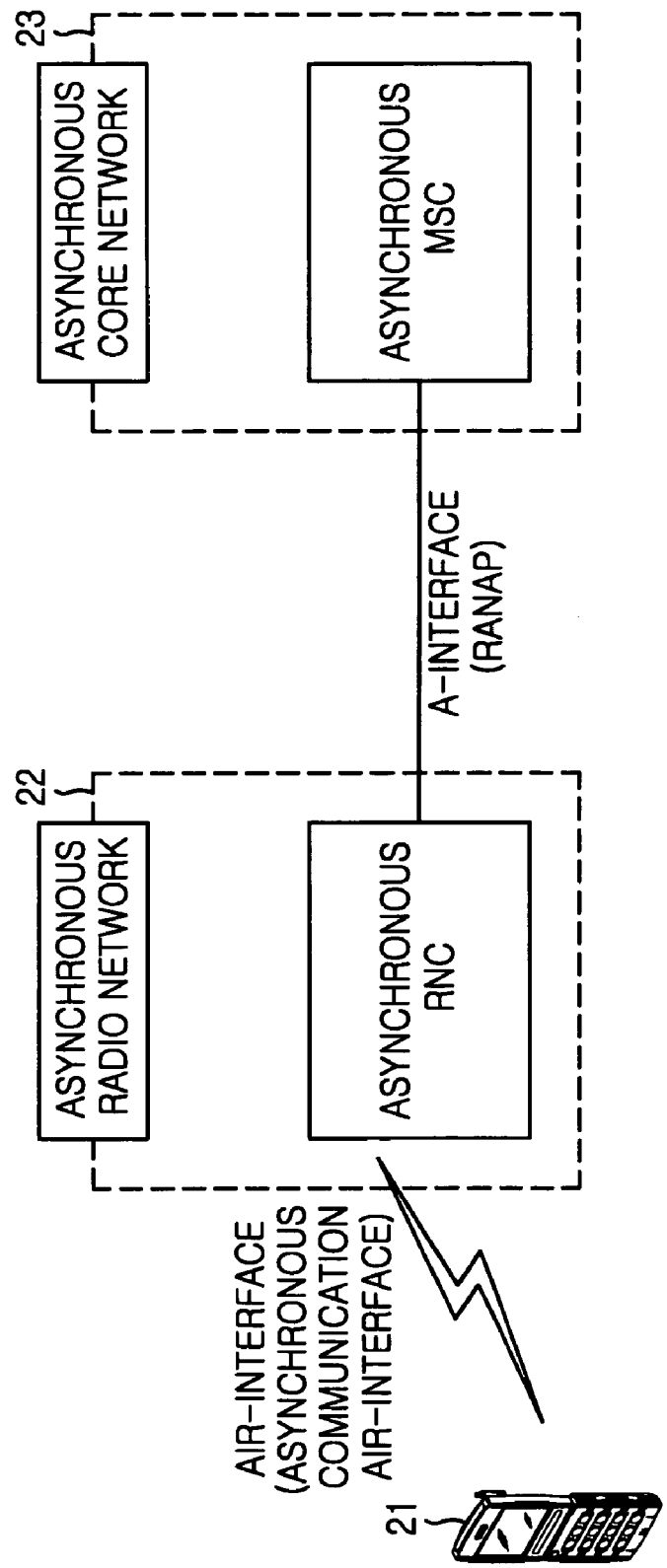
FIG. 1B is a pictorial representation of conventional structuring of an asynchronous mobile communication system interlocking with an asynchronous core network.
Figure 2B:
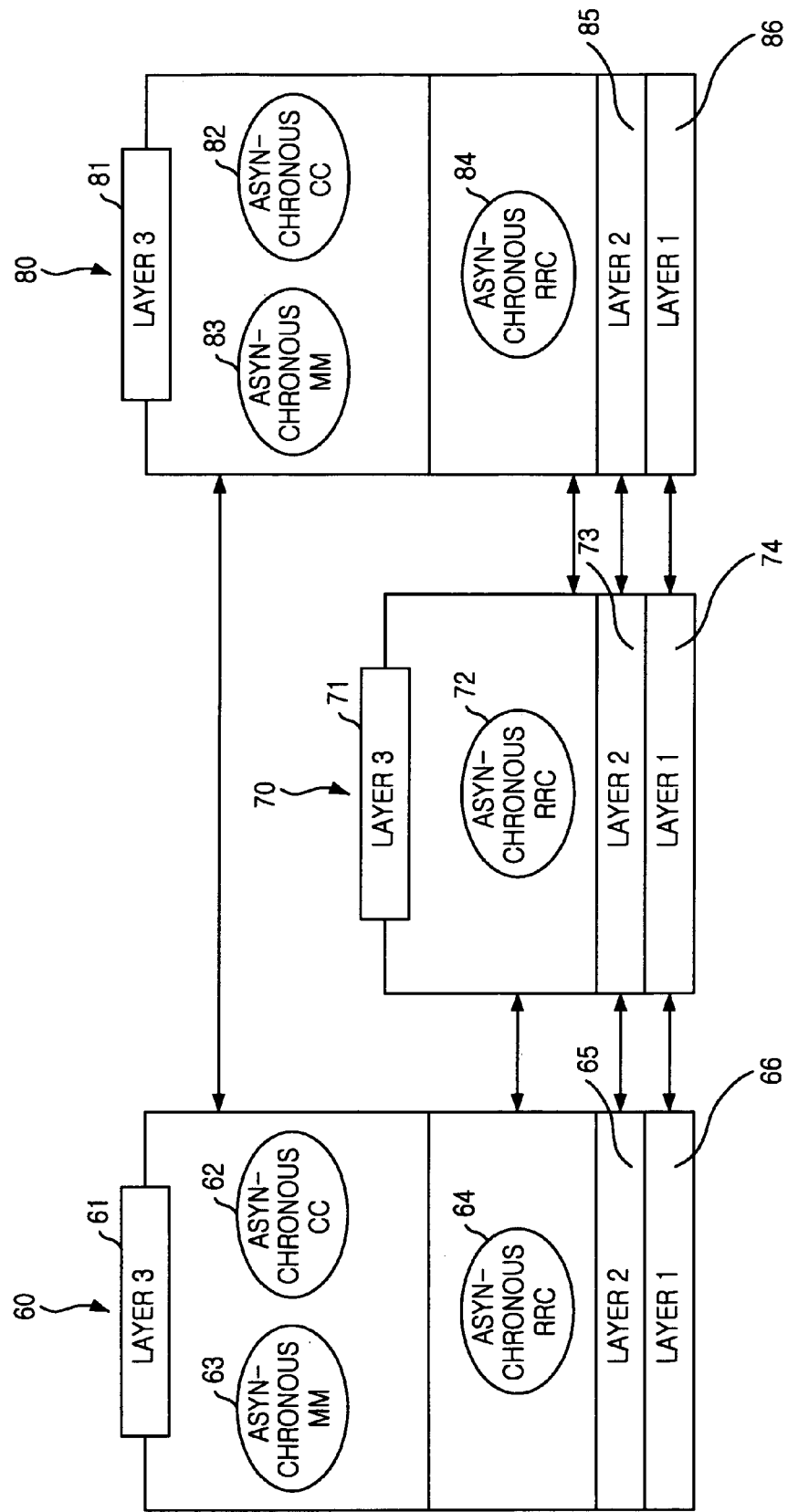
FIG. 2B is a diagram representing protocol structures of each section in the asynchronous mobile communication system.
Figure 3A:
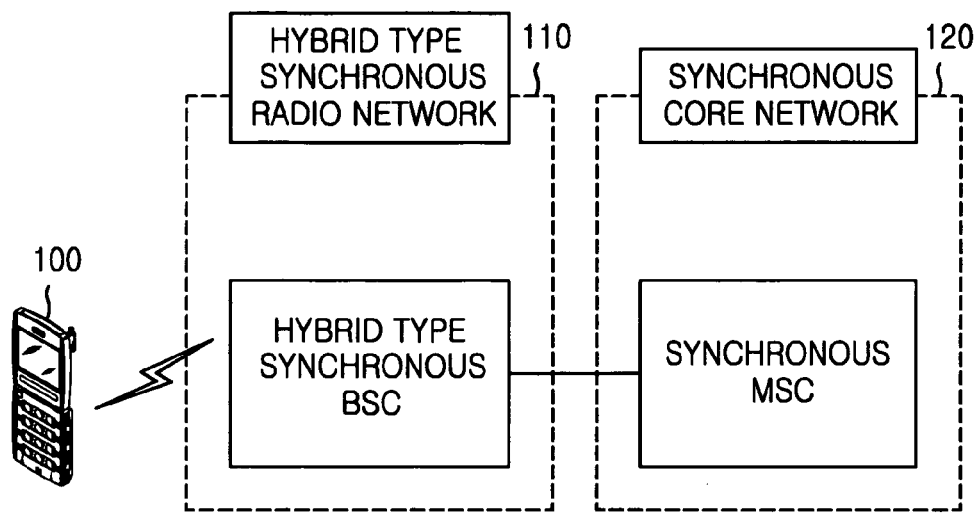
FIG. 3A is a pictorial representation of structure of interlocking with a synchronous ANSI-41 core network in a synchronous mobile communication system.
Figure 3B:
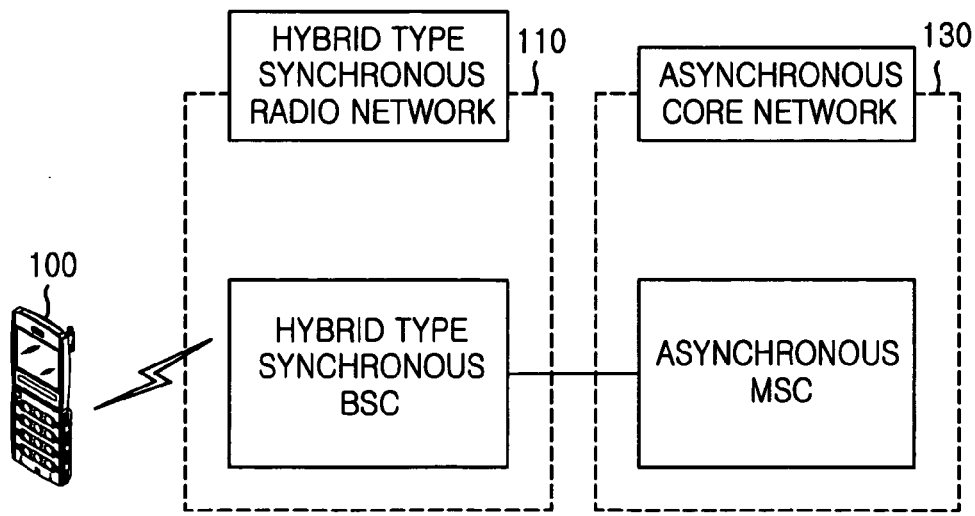
FIG. 3B is a pictorial representation of structure of interlocking with an asynchronous GSM-MAP core network in a synchronous mobile communication system.
Figure 3C:
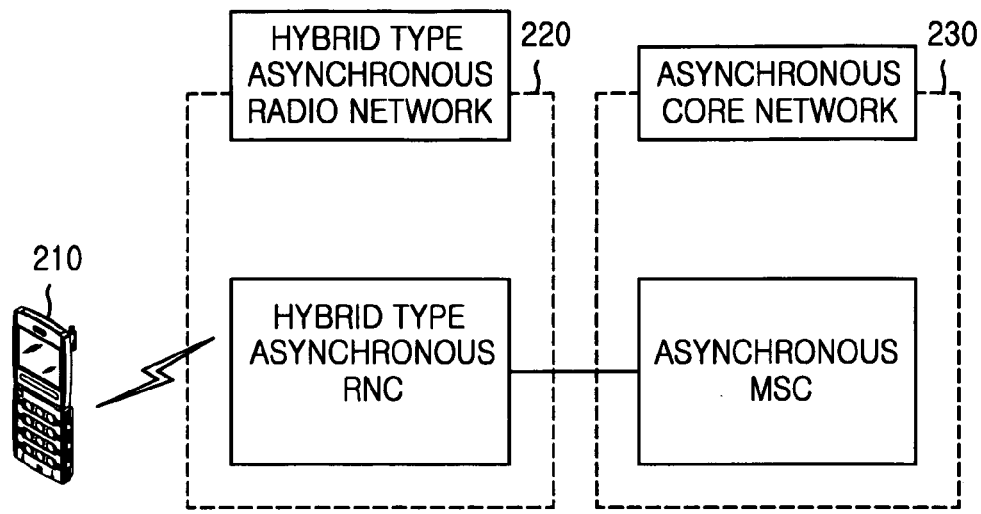
FIG. 3C is a pictorial representation of structure of interlocking with an asynchronous GSM-MAP core network in an asynchronous mobile communication system.
Figure 3D:
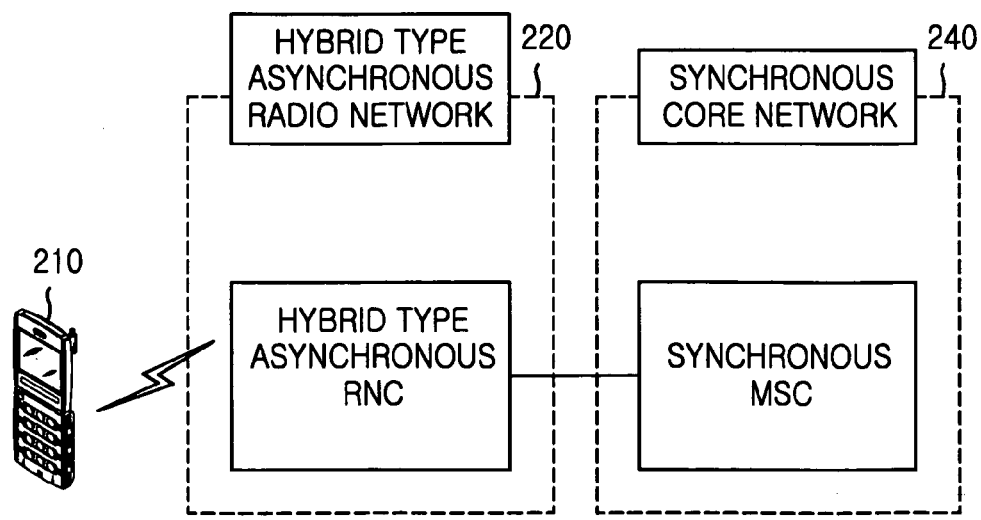
FIG. 3D is a pictorial representation of structure of interlocking with a synchronous ANSI-41 core network in an asynchronous mobile communication system.
Figure 4B:
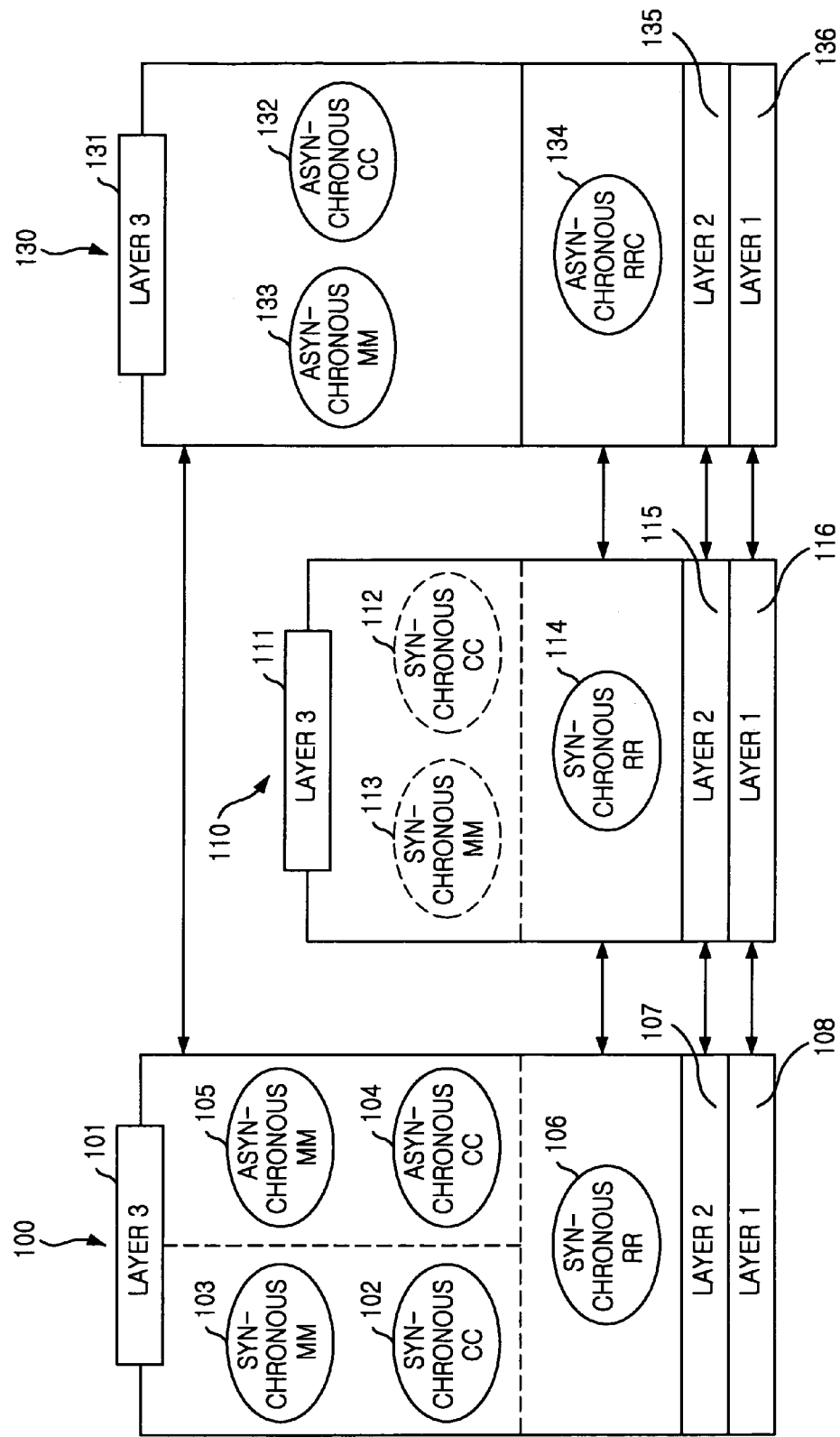
FIG. 4B is a schematic diagram representing protocol layers structure in the synchronous mobile communication system interlocking with an asynchronous core network.
Figure 4C:
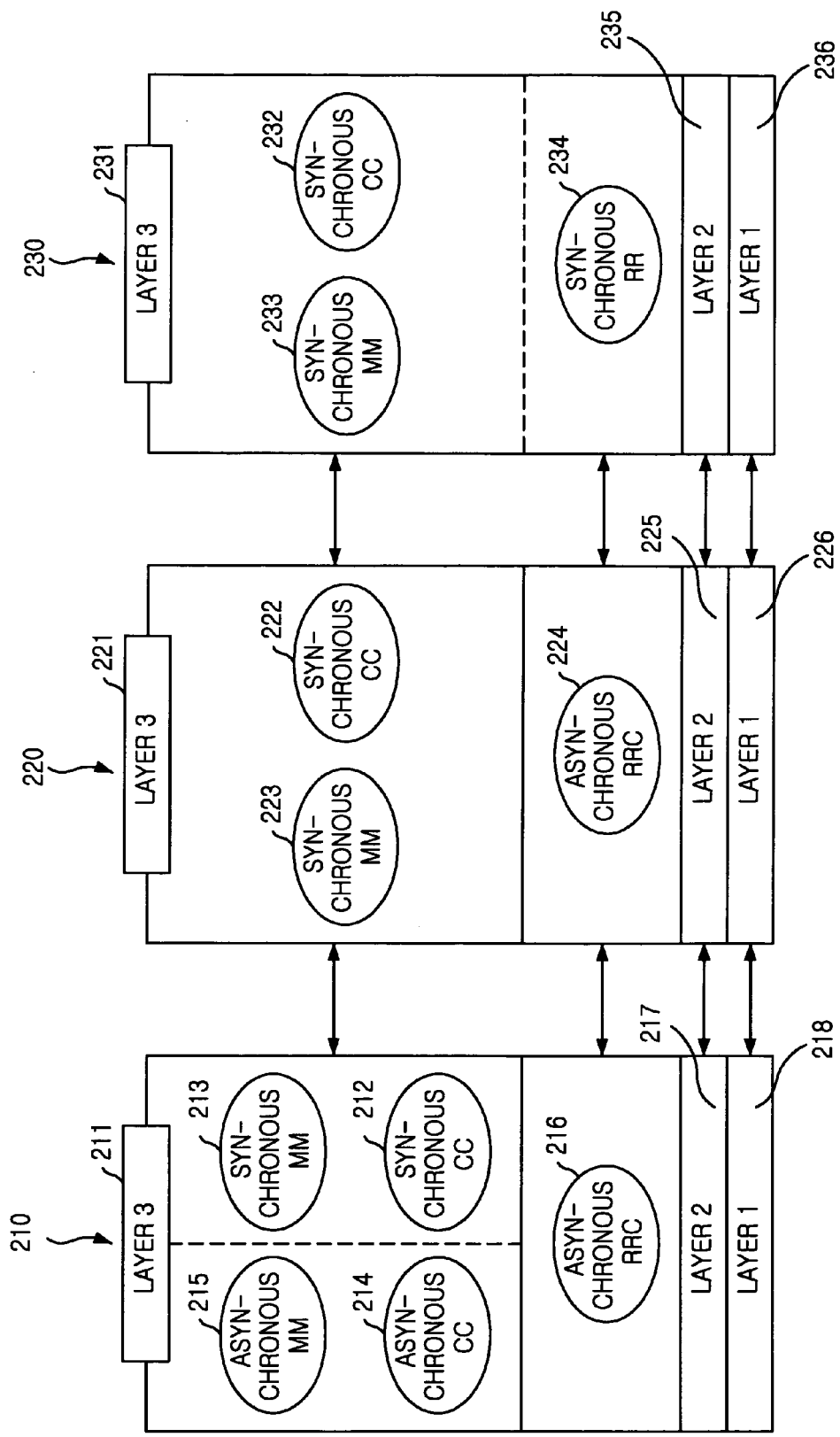
FIG. 4C is a schematic diagram representing protocol layers structure in the asynchronous mobile communication system interlocking with a synchronous ANSI-41 core network.
Figure 4D:
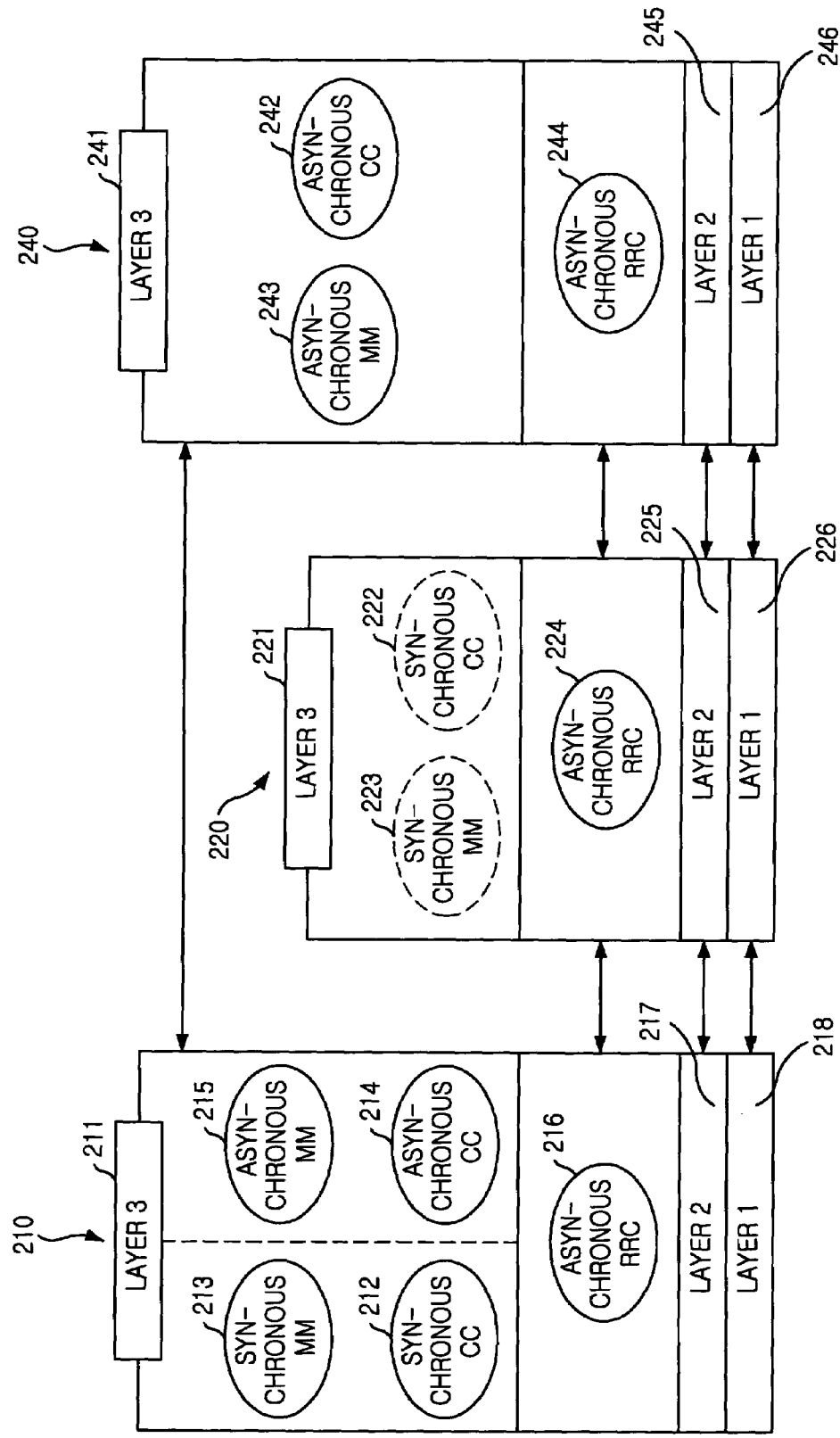
FIG. 4D is a schematic diagram representing protocol layers structure in the asynchronous mobile communication system interlocking with an asynchronous GSM-MAP core network.
Figure 5:
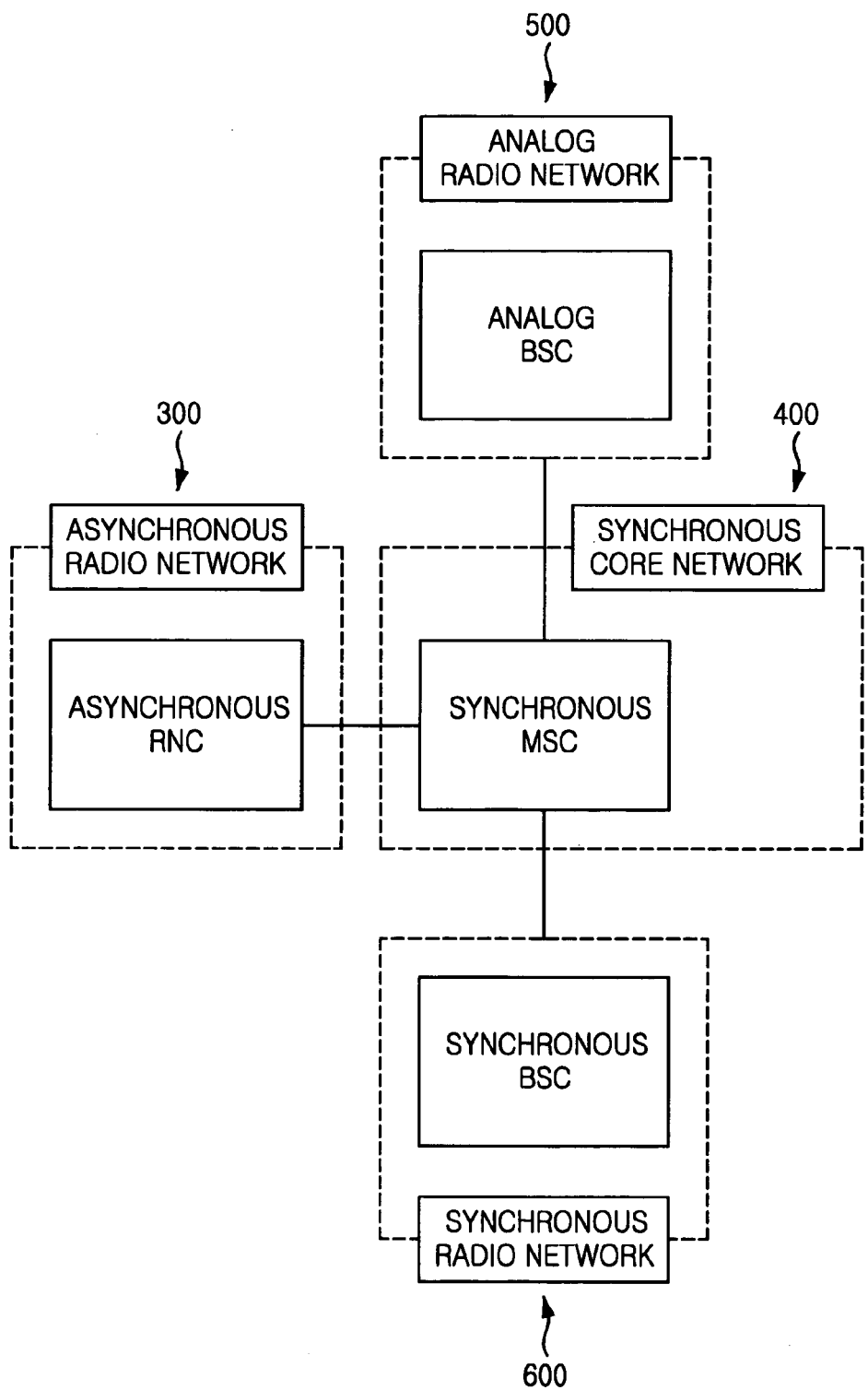
FIG. 5 is a pictorial representation of a whole interlocking structure, in case a core network is an ANSI-41 network in accordance with the present invention.

FIG. 5 is a pictorial representation of a whole interlocking structure, in case a core network is an ANSI-41 network in accordance with the present invention.

A reference numeral 300 denotes an asynchronous radio network in the asynchronous mobile communication system. A reference numeral 400 denotes a synchronous core network connected to the asynchronous radio network 300. A reference numeral 500 denotes an analog radio network capable of being connected to the synchronous core network 400. A reference numeral 600 denotes a synchronous radio network capable of being connected to the synchronous core network 400.

FIG. 6 is a pictorial representation of interface protocols in a wired area and a radio area.

Reference numerals 310, 300 and 400 denote an asynchronous mobile station, an asynchronous radio network and a synchronous core network, respectively.

In this interlocking structure, an interface protocol for the radio area, that is, the interface protocol between the asynchronous mobile station 310 and the asynchronous radio network 300 should follow an Asynchronous Communication Air-Interface of a conventional international communication protocol for asynchronous communication mode. An interface for wire service area, that is, the interface protocol between the asynchronous radio network 300 and the synchronous core network 400 should follow a 3G-IOS of a conventional international communication protocol.

As can be seen from above, a new type of processing method for a handoff and a call is required in the interlocking structure having different communication modes.

In the present invention, there is provided a method of processing a handoff and a call capable of processing a handoff and a call in the interlocking structure having the different communication modes.

Embodiment 1

Figure 7A:
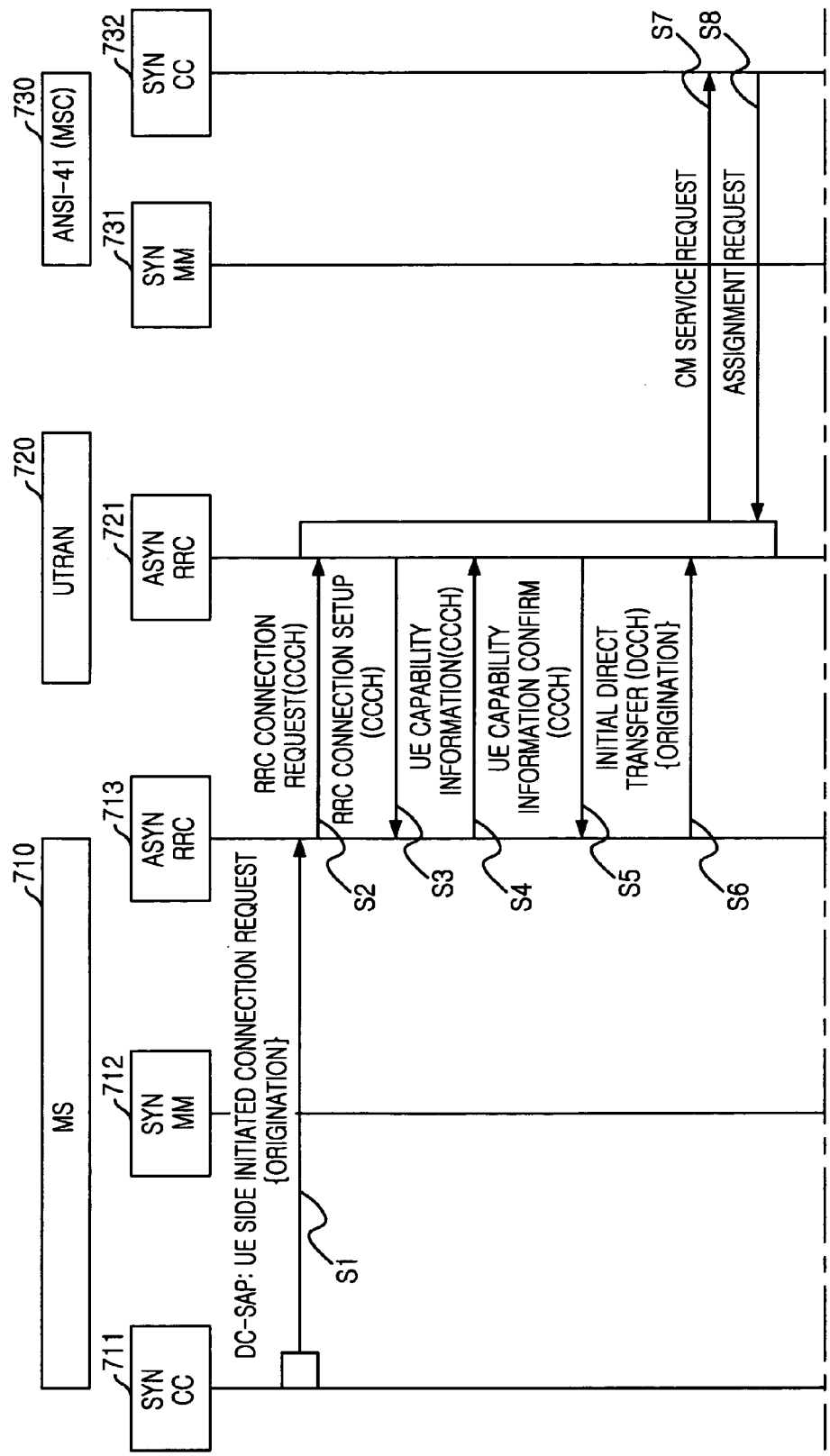

FIGS. 7A to 7C are flow charts representing a method for processing a call in the asynchronous mobile communication system in accordance with the present invention.

Reference numerals 710, 711, 712 and 713 denote an asynchronous mobile station, a call control (CC) entity, a Mobility Management (MM) entity and a radio resource controller (RRC), respectively. The asynchronous mobile station includes the call control (CC) entity, the Mobility Management (MM) entity and a radio resource controller (RRC).

Reference numerals 720 and 721 denote an asynchronous radio network UTRAN and a radio resource controller (RRC) included in the UTRAN, respectively.

Reference numerals 730, 731 and 732 denote a synchronous ANSI-41 core network, a Mobility Management (MM) entity and a call control entity, respectively. A Mobility Switching Center (MSC) in the synchronous core network 730 includes the Mobility Management (MM) entity 731 and the call control (CC) entity 732.

As shown in FIGS. 7A to 7C, this interlocking structure is the structure of interlocking the synchronous core network and the asynchronous radio network in the asynchronous mobile communication system, and hereinafter, the method for processing the call in this structure will be described.

At step S1, the call control (CC) entity included in a Non Access Stratum (NAS) of the asynchronous mobile station 710 transmits an 'Origination' message to a radio resource controller (RRC) included in an Access Stratum (AS) of the asynchronous mobile station by using a Primitive. The Primitive represents 'mobile station (MS) Side Initiated Connection Establishment Request' message of a Dedicated Control Service Access Point (DC-SAP) provided by the Access Stratum (AS). Receiving the 'Origination' message, a Call Origination is started.

At step S2, the RRC in the asynchronous mobile station that receives the 'Origination' message should make a connection with the RRC in the asynchronous radio network 720 having a base transceiver station which is also is called a Node B and a base station controller which is also called a Radio Network Controller. At this time, a Dedicated Control Channel (DCCH) can be used. Consequently, the RRC in the asynchronous mobile station transmits a 'RRC Connection Request' message to the RRC in the asynchronous radio network 720 and requests 'RRC Connection'.

At step S3, the RRC 721 in the asynchronous radio network 720 that receives the 'RRC Connection Request' message from the RRC 713 in the asynchronous mobile station 710 performs RRC connection by using information contained in the asynchronous mobile station. After that, through an 'RRC Connection Setup' message, the RRC 721 informs the asynchronous mobile station that an RRC connection is completed, and provides information about the DCCH to the asynchronous mobile station 710. The DCCH is co-used by the asynchronous radio network 720 and the asynchronous mobile station 710.

At step S4, after receiving the 'RRC Connection Setup' message from the asynchronous radio network, the RRC in the asynchronous mobile station stores information about the DCCH to be used by itself, and establishes the DCCH. And then, the RRC in the asynchronous mobile station transmits information about the capability of the asynchronous mobile station to the RRC in the asynchronous radio network through a 'UE Capability Information' message.

At step S5, after receiving the 'UE Capability Information' message from the RRC 713 in the asynchronous mobile station, the RRC 721 in the asynchronous radio network stores information about capability of the asynchronous mobile station and transmits a 'UE Capability Confirm' message to the RRC 713 in the asynchronous mobile station.

At step S6, after receiving the 'UE Capability Confirm' message from the RRC 721 in the asynchronous radio network, the RRC 713 in the asynchronous mobile station transmits an 'Origination' message through an 'Initial ' 'Initial Direct Transfer' message to the RRC 721 in the asynchronous radio network. The 'Initial Direct Transfer' message is defined in the RRC protocol, as used to transmit a protocol entity included in the NAS between the RRC 713 in the asynchronous mobile station and the RRC 721 in the asynchronous radio network. That is, the 'Origination' message, which is included as a portion of the parameters in the 'Initial Direct Transfer' message, is transmitted.

At step S7, after receiving the 'Initial Direct Transfer' message from the RRC 713 in the asynchronous mobile station, the RRC 721 in the asynchronous radio network selects and analyzes the 'Origination' message from the received message, and then stores necessary information. By referring to the received 'Origination' message, the RRC 721 in the asynchronous radio network transmits a 'CM Service Request' message to the synchronous core network. The 'CM Service Request' message informs that a 'Call Origination' message arrived from the synchronous mobile station.

At step S8, after receiving the 'CM Service Request' message from the asynchronous radio network 720, the synchronous core network stores information about the asynchronous mobile station requesting the 'Call Origination', information about the asynchronous mobile station to be called and a lot of information about service to be requested, et al.,. The synchronous core network transmits information required to assign a wire resource by which the asynchronous radio network can communicate with the synchronous core network; and a 'Assignment Request' message ordering to assign a radio resource by which the asynchronous radio network can communicate with the asynchronous mobile station, to the asynchronous radio network.

At step S9, after receiving the 'Assignment Request' message from the synchronous core network, the asynchronous radio network establishes the wire resource by which it communicates with the synchronous core network, and performs a process of assigning the radio resource by which it communicates with the asynchronous mobile station. In order to assign the radio resource, the RRC in the asynchronous radio network transmits a 'Ciphering Mode Command' message having information of ciphering for data security, which the asynchronous mobile station transmits during a phone call through the 'Downlink Direct Transfer' message to the RRC in the asynchronous mobile station.

At step S10, after receiving the 'Ciphering Mode Command' message through the 'Downlink Direct Transfer' message from the RRC in the asynchronous radio network, the RRC in the asynchronous mobile station transmits this information through the primitive of 'Data Transfer Indication' provided by the DC-SAP to the mobility management (MM) entity included in the NAS of the asynchronous mobile station.

At step S11, after receiving the 'Ciphering Mode Command' message from the RRC in the asynchronous mobile station, the Mobility Management (MM) entity in the asynchronous mobile station stores the information about ciphering, and transmits a 'Ciphering Mode Complete' message through the primitive of 'Data Transfer Request' provided by the DC-SAP to the RRC 713 in the asynchronous mobile station.

At step S12, after receiving the 'Ciphering Mode Complete' message from the MM entity in the asynchronous mobile station, the RRC 713 in the asynchronous mobile station transmits the 'Ciphering Mode Complete' message through the 'Uplink Direct Transfer' message to the RRC 721 in the asynchronous radio network.

At step S13, after receiving the 'Ciphering Mode Complete' message from the MM entity in the asynchronous mobile station, the RRC in the asynchronous radio network is informed that establishment of ciphering is completed, and transmits a 'Channel Assignment' message through the 'Downlink Direct Transfer' message to the RRC 713 in the asynchronous mobile station, in order to establish the radio resource. The 'Channel Assignment' message contains information about a radio bearer resource.

At step S14, after receiving the 'Channel Assignment' message from the RRC 721 in the asynchronous radio network, the RRC 713 in the asynchronous mobile station transmits the channel assignment message through the primitive of 'UE Side Initiated Connection Establishment Confirm' provided by the DC-SAP, to the CC entity in the asynchronous mobile station. After receiving the 'Channel Assignment' message from the RRC 713 in the asynchronous mobile station, the CC entity in the asynchronous mobile station stores information from the message. This message can be substituted for a 'Radio Bearer Assignment Setup'.

At step S15, after transmitting the 'Channel Assignment' message, the RRC 721 in the asynchronous radio network transmits a 'Radio Bearer Assignment Setup' message for substantially establishing the radio resource between the asynchronous radio network and the asynchronous mobile station, to the RRC 713 in the asynchronous mobile station.

At step S16, after receiving the 'Radio Bearer Assignment Setup' message from the RRC 721 in the asynchronous radio network, the RRC 713 in the asynchronous mobile station stores information necessary for establishing the radio resource, and transmits a 'Radio Bearer Assignment Setup' message containing the rest of information to the CC entity in the asynchronous mobile station, through the primitive of 'UE Side Initiated Radio Access Bearer Establishment Indication' provided by the DC-SAP. After that, it establishes the radio resource by using the stored information.

At step S17, after receiving the 'Radio Bearer Assignment Setup' message from the RRC 713 in the asynchronous mobile station, the CC entity in the asynchronous mobile station stores information extracted exacted from the 'Radio Bearer Assignment Setup' message, and transmits a 'Radio Bearer Assignment Setup Complete' message through the primitive of 'UE Side Initiated Radio Access Bearer Establishment Response' provided by the DC-SAP, to the RRC in the asynchronous mobile station.

At step S18, after receiving the 'Radio Bearer Assignment Setup Complete' message from the CC entity 711 in the asynchronous mobile station, the RRC 713 in the asynchronous mobile station completes establishment of the radio resource, and then transmits a 'Radio Bearer Setup Complete' message to the RRC 721 in the asynchronous radio network.

At step S19, after receiving the 'Radio Bearer Setup Complete' message from the RRC 713 in the asynchronous mobile station, the RRC 721 in the asynchronous radio network is informed that establishment of the radio resource is completed, and transmits a 'Service Connect' message through the 'Downlink Direct Transfer' message to the RRC 713 in the asynchronous mobile station. Thereby, structural information for service originally requested by the asynchronous mobile station is transmitted to the asynchronous mobile station, so that the asynchronous mobile station can perform call processing according to this structural information.

At step S20, after receiving the 'Service Connect' message from the RRC 721 in the asynchronous radio network, the RRC 713 in the asynchronous mobile station transmits the 'Service Connect' message through the primitive of the 'Data Transfer Indication' provided by the DC-SAP, to the CC entity 711 in the asynchronous mobile station.

At step S21, after receiving the 'Service Connect' message from the RRC 713 in the asynchronous mobile station, the CC entity in the asynchronous mobile station stores the structural information for service, and transmits a 'Service Connect Complete' message through the primitive of 'Data Transfer Request' provided by the DC-SAP to the RRC in the asynchronous mobile station.

At step S22, after receiving the 'Service Connect Complete' message from the CC entity 711 in the asynchronous mobile station, the RRC 713 in the asynchronous mobile station transmits the 'Service Connect Complete' message through the 'Uplink Direct Transfer' message, to the RRC 721 in the asynchronous radio network.

At step S23, after receiving the 'Service Connect Complete' message from the RRC 713 in the asynchronous mobile station, the RRC 721 in the asynchronous radio network is informed that establishment of the structural information for service is completed and the establishment of the radio resource is completed, and transmits an 'Assignment Complete' message to the synchronous core network, in order to inform the synchronous core network that the asynchronous mobile station is in a state of being capable of a phone call.

At step S24, after receiving the 'Assignment Complete' message from the asynchronous radio network, the synchronous core network is informed that the asynchronous mobile station is in the state of being capable of the phone call, and transmits a Ring Back Tone ordering to wait until a phone call gets started through an 'Alert' message, to the RRC 721 in the asynchronous radio network.

At step S25, after receiving the 'Alert' message from the CC entity in the synchronous core network, the asynchronous radio network transmits the 'Alert' message through the 'Downlink Direct Transfer' message to the RRC 713 in the asynchronous mobile station.

At step S26, after receiving the 'Alert' message from the RRC 721 in the asynchronous radio network, the RRC 713 in the asynchronous mobile station transmits this message through the primitive of the 'Data Transfer Indication' provided by the DC-SAP, to the CC entity 711 in the asynchronous mobile station. After receiving the 'Alert' message, the CC entity 711 in the asynchronous mobile station generates a tone for a user, interlocking with a hardware.

By proceeding with the steps described so far, interlocking between the asynchronous mobile station and the synchronous core network can be carried out.

Embodiment 2

Figure 8:
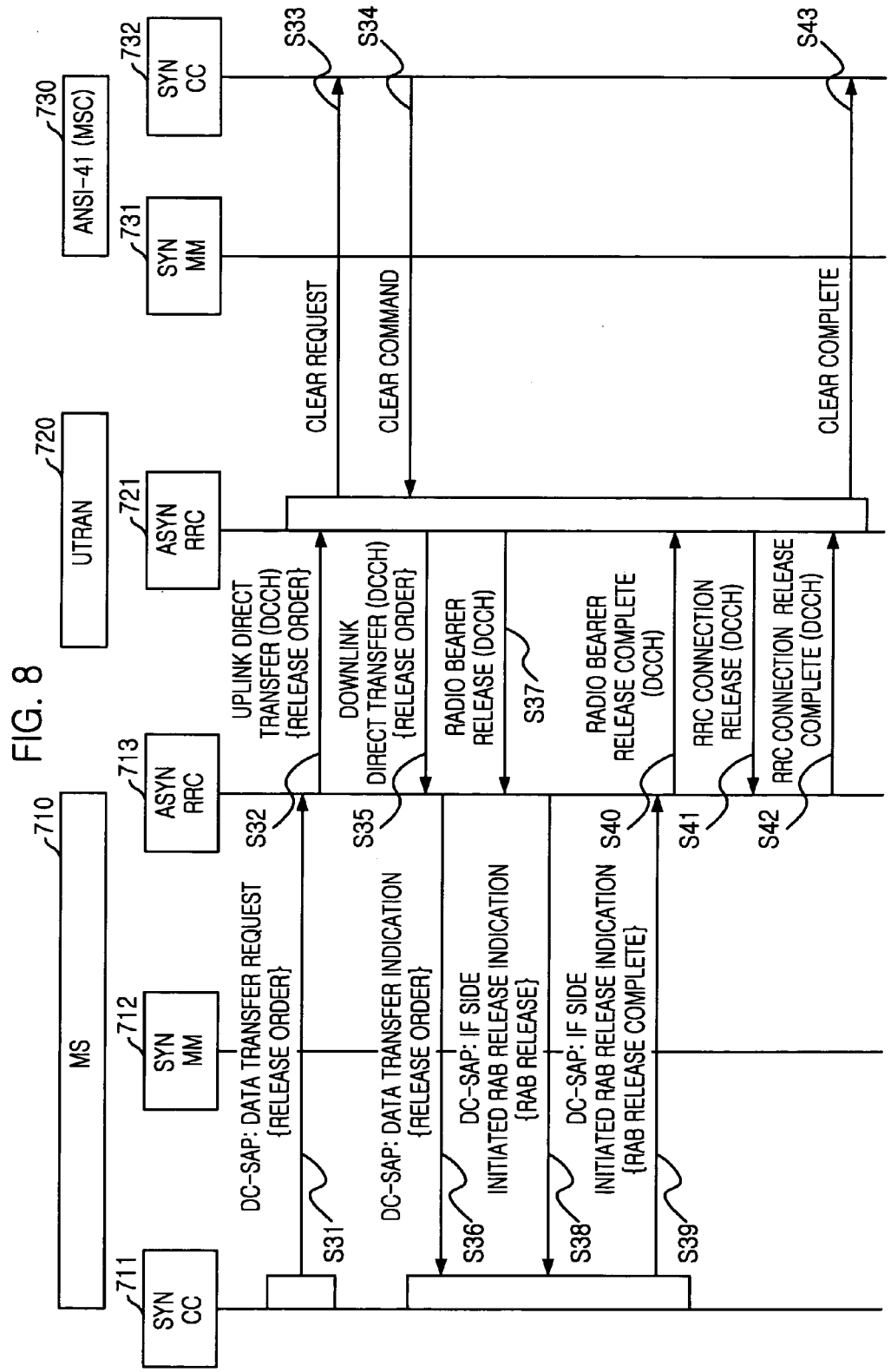
FIG. 8 represents a Call Clearing Flow initiated by the asynchronous mobile station, in case the synchronous ANSI-41 core network is coupled to the asynchronous radio network in the asynchronous mobile communication system.

FIG. 8 is a flow chart representing a second embodiment of a method for processing a call in the asynchronous mobile communication system. Particularly, FIG. 8 represents a Call Clearing Flow initiated by the asynchronous mobile station, where the synchronous ANSI-41 core network is coupled to the asynchronous radio network in the asynchronous mobile communication system.

Reference numerals 710, 711, 712 and 713 denote an asynchronous mobile station, a call control (CC) entity, a Mobility Management (MM) and a radio resource controller (RRC), respectively. The asynchronous mobile station includes the call control (CC) entity 711, the Mobility Management (MM) 712 and the radio resource controller (RRC) 713.

Reference numerals 720 and 721 denote an asynchronous radio network UTRAN and a radio resource controller (RRC) included in the asynchronous radio network UTRAN 720, 1 respectively.

Reference numerals 730, 731 and 732 denote a synchronous ANSI-41 core network, a Mobility Management (MM) and a call control (CC) entity, respectively. And the Mobility Management (MM) 731 and the call control (CC) entity 732 are included in a Mobile Switching Center (MSC) of the synchronous core network 730.

Hereinafter, a process for a call clearing in this interlocking structure will be described.

At step S31, when terminating the phone call, the CC entity 711 in the asynchronous mobile station transmits a 'Release Order' message requesting to release a wire resource and a radio resource through the primitive of the 'Data Transfer Request' provided by the DC-SAP to the RRC 713 in the asynchronous mobile station.

At step S32, after receiving this message, the RRC 713 in the asynchronous mobile station transmits the 'Release Order' message through the 'Uplink Direct Transfer' message to the RRC in the asynchronous radio network.

At step S33, after receiving the Direct Transfer RRC message, the asynchronous radio network is informed that the asynchronous mobile station requests to release the wire and radio resources, and transmits a 'Clear Request' message to the CC entity in the MSC of the synchronous core network.

At step S34, after receiving this message, the CC entity in the MSC of the synchronous core network is informed that the asynchronous mobile station requests to release the wire resource and the radio resource, and transmits a 'Clear Command' message to the asynchronous radio network, in order to command the asynchronous radio network to release the wire resource and the radio resource.

At step S35, after receiving this message, in response to the 'Release Order' message received from the asynchronous mobile station at the step S32, the asynchronous radio network transmits a 'Release Order' message to the RRC 713 in the asynchronous mobile station, in order to start to release the wire resource and the radio resource, and then starts to release the wire resource and the radio resource.

At step S36, after receiving this message, the RRC in the asynchronous mobile station transmits the 'Release Order' message through the primitive of the 'Data Transfer Indication' provided by the DC-SAP, to the CC entity in the asynchronous mobile station.

At step S37, in order to release the radio resource, the RRC 721 in the asynchronous radio network transmits a 'Radio Bearer Release' message to the RRC 713 in the asynchronous mobile station.

At step S38, after receiving this message, the RRC in the asynchronous mobile station performs releasing a radio resource for exclusive use, and transmits a 'Radio Bearer Release' message containing information of the release completion through the primitive of an 'IF Side Initiated Radio Access Bearer Release Indication' provided by DC-SAP, to the CC entity in the asynchronous mobile station.

At step S39, after receiving this message, the CC entity in the asynchronous mobile station is informed that the radio resource for exclusive use between the asynchronous mobile station and the asynchronous radio network was released, and in response to the received message, transmits a 'Radio Bearer Release Complete' message through the primitive of the 'IF Side Initiated Radio Access Bearer Release Indication' provided by the DC-SAP, to the RRC 713 in the asynchronous mobile station 710.

At step S40, after receiving the message, the RRC 713 in the asynchronous mobile station transmits a 'Radio Bearer Release Complete' message to the RRC in the asynchronous radio network. The message serves to inform that releasing the radio resource for exclusive use between the asynchronous mobile station and the asynchronous radio network is completed.

At step S41, after receiving the message, the RRC 721 in the asynchronous radio network mobile station transmits an 'RRC Connection Release' message to the RRC 713 in the asynchronous mobile station, in order to release a Layer-3 signaling and a radio resource.

At step S42, after receiving the 'RRC Connection Release' message, the RRC 713 in the asynchronous mobile station 710 is informed that the Layer-3 signaling and the radio resource should be released for should release between the asynchronous radio network and itself; transmits an 'RRC Connection Release Complete' message to release the Layer-3 signaling and the radio resource to the RRC in the asynchronous radio network; and performs releasing the Layer-3 signaling and the radio resource.

At step S43, after receiving the 'RRC Connection Release Complete' message, the RRC in the asynchronous radio network is informed that the Layer-3 signaling and the radio resource for common use were released, and transmits a 'Clear Complete' message to the protocol entity in the synchronous core network, so that the CC protocol entity can be informed that the release of all resources and signaling is completed between the asynchronous mobile station and itself.

By proceeding with the steps described above, the connected call can be released.

FIG. 9 is a flow chart representing a method for processing a call clearing, where the synchronous core network initiates a call-clearing signal in the asynchronous mobile communication system.

Reference numerals 710, 711, 712 and 713 denote an asynchronous mobile station, a call control (CC) entity, a Mobility Management (MM) and a radio resource controller (RRC), respectively. The asynchronous mobile station 710 includes the call control (CC) entity, the Mobility Management (MM) and the radio resource controller (RRC).

Reference numerals 720 and 721 denote an asynchronous radio network UTRAN, and a radio resource controller (RRC) included in the asynchronous radio network UTRAN 720, respectively.

Reference numerals 730, 731 and 732 denote a synchronous ANSI-41 core network, a Mobility Management (MM) and a call control (CC) entity, respectively. And the Mobility Management (MM) 731 and the call control (CC) entity 732 are included in the synchronous core network 730.

At step S51, the synchronous core network transmits a 'Clear Command' message to the asynchronous radio network, in order to command the asynchronous radio network to release the wire resource and the radio resource.

At step S52, after receiving the 'Clear Command' message, the asynchronous radio network transmits a 'Release Order' message to the RRC 713 in the asynchronous mobile station 710 in order to start releasing the wire resource and the radio resource, and starts releasing the wire resource and the radio resource.

At step S53, after receiving the 'Release Order' message, the RRC 713 in the asynchronous mobile station 710 transmits the 'Release Order' message through the primitive of the 'Data Transfer Indication' provided by DC-SAP, to the CC entity in the asynchronous mobile station.

At step S54, the RRC in the asynchronous radio network transmits a 'Radio Bearer Release' message to the RRC in the asynchronous mobile station, in order to release the radio resource.

At step S55, after receiving the 'Radio Bearer Release' message, the RRC 713 in the asynchronous mobile station 710 performs releasing the radio resource for exclusive use, and transmits the 'Radio Bearer Release' message containing information of completing the release, through the primitive of the 'IF Side Initiated Radio Access Bearer Release Indication' provided by the DC-SAP, to the CC entity 711 in the asynchronous mobile station 710.

At step S56, after receiving the 'Radio Bearer Release' message, the CC entity in the asynchronous mobile station is informed that the radio resource for exclusive use between the asynchronous mobile station 710 and the asynchronous radio network 720 was released, and in response to the received message, transmits the 'Radio Bearer Release Complete' message through the primitive of the 'IF Side Initiated Radio Access Bearer Release Indication' provided by the DC-SAP, to the RRC 713 in the asynchronous mobile station 710.

At step S57, after receiving the 'Radio Bearer Release Complete' message, the RRC 713 in the asynchronous mobile station 710 transmits the 'Radio Bearer Release Complete' message to the RRC 721 in the asynchronous radio network 720, in order to inform that the release of the radio resource for exclusive use between the asynchronous radio network and itself was completed.

At step S58, after receiving the 'Radio Bearer Release Complete' message, the RRC 721 in the asynchronous radio network 720 transmits the 'RRC Connection Release' message to the RRC 713 in the asynchronous mobile station 710, in order to release the Layer-3 signaling and the radio resource.

At step S59, after receiving the 'RRC Connection Release' message, the RRC 713 in the asynchronous mobile station 710 is informed that the Layer-3 signaling and the radio resource should be released between the asynchronous radio network 720 and itself; transmits the 'RRC Connection Release Complete' message to release the Layer-3 signaling and the radio resource, to the RRC 721 in the asynchronous radio network 720; and performs releasing the Layer-3 signaling and the radio resource.

At step S60, after receiving the 'RRC Connection Release Complete' message, the RRC 721 in the asynchronous radio network 720 is informed that the Layer-3 signaling and the radio resource were released, and transmits a 'Clear Complete' message to the CC protocol entity in the synchronous core network, so that the CC protocol entity can be informed that the release of all resources and signaling is completed between the asynchronous mobile station 710 and itself.

Embodiment 3

Figure 10B:
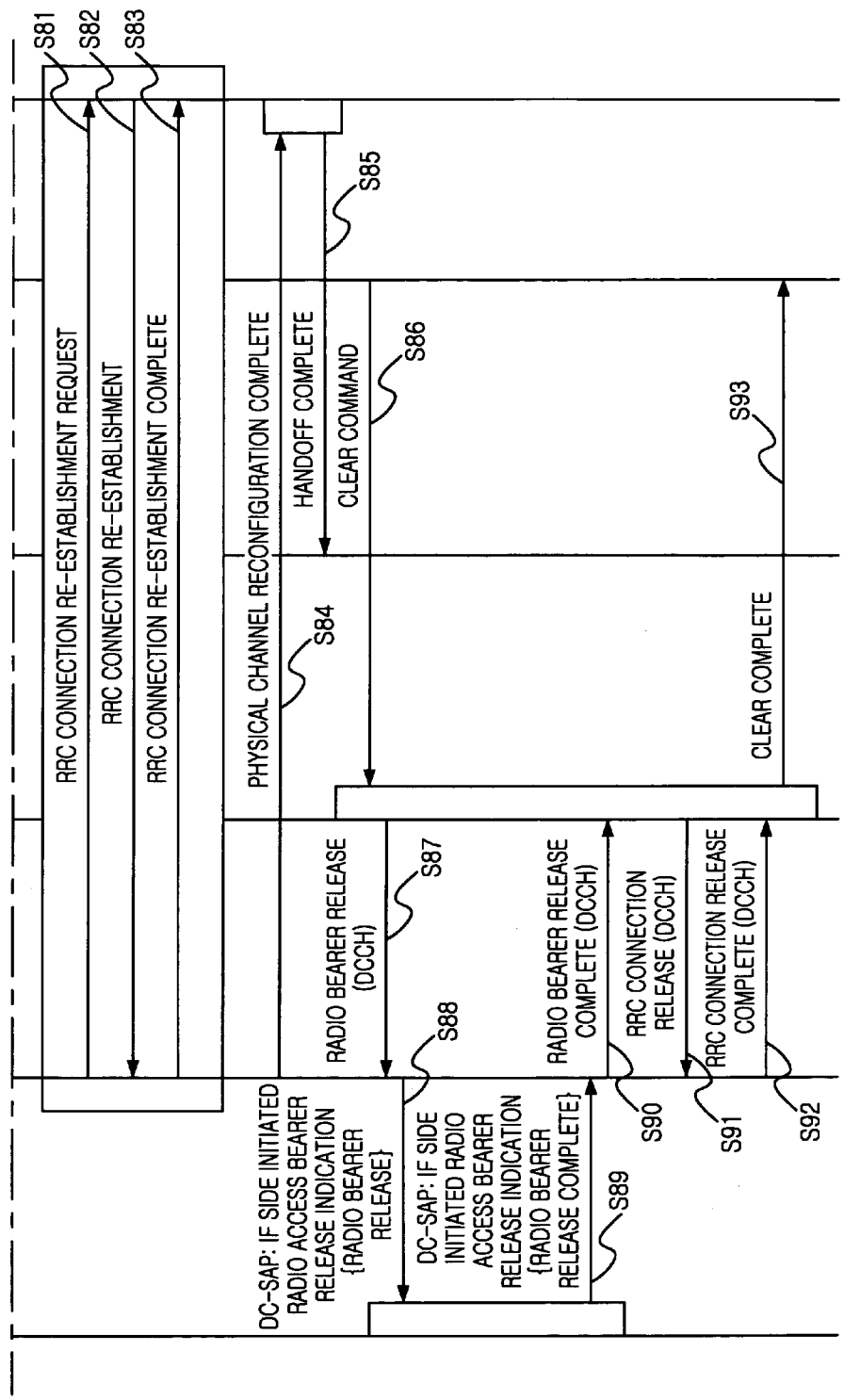

FIGS. 10A and 10B are flow charts representing a method for processing a handoff in the asynchronous mobile communication system in accordance with the present invention. In this system, a synchronous core network is interlocked with a source asynchronous radio network and a target asynchronous radio network.

Reference numerals 740, 741 and 742 denote an asynchronous mobile station, a synchronous call control (CC) entity, and an asynchronous resource controller (RRC) included in the asynchronous mobile station 740, respectively.

Reference numerals 750 and 751 denote a source asynchronous radio network, and an asynchronous radio resource controller (RRC) included in the source asynchronous radio network, respectively.

Reference numerals 760, 761 and 762 denote a synchronous ANSI-41 core network, a synchronous radio resource (RR) included in the synchronous core network, and a synchronous call control (CC) entity included in the synchronous core network, respectively.

Reference numerals 770 and 771 denote a target asynchronous radio network interlocked with the synchronous core network 760, and an asynchronous radio resource controller (RRC) included in the target asynchronous radio network 770, respectively.

At step S71, the RRC in the source asynchronous radio network provides information capable of measuring performance and power of a radio link to the RRC in the asynchronous mobile station. With this information, the asynchronous mobile station measures the radio link, and transmits the result of measurement to the RRC in the source asynchronous radio network 750, and then it is determined whether a handoff is possible or not, based on this result. In order to perform the above process, the RRC in the source asynchronous radio network transmits a 'Measurement Control' message to the RRC in the asynchronous mobile station 740.

At step S72, after receiving the 'Measurement Control' message from the RRC in the source asynchronous radio network 750, the asynchronous mobile station 740 measures the performance and the power of the radio link with information in the received message, and transmits a 'Measurement Report' message containing the result of the measurement to the RRC 751 in the source asynchronous radio network 750. After receiving the 'Measurement Report' message, the RRC 751 in the asynchronous radio network 750 determines, with information in the received message, whether it allows a handoff.

At step S73, if the RRC 751 in the asynchronous radio network 750 determines to allow the handoff, the RRC 751 in the asynchronous radio network 750 transmits a 'Handoff Required' message for requesting a handoff, to the RR 761 in the MSC of the synchronous core network 760. This message includes information of the target asynchronous radio network targeted for handoff.

At step S74, after receiving the 'Handoff Required' message from the source asynchronous radio network 750, the RR 761 in the MSC of the synchronous core network 760 analyzes information in the received message, and grasps information of the target asynchronous radio network which is a target base station for the handoff. And then, by transmitting a 'Handoff Request' message to the target asynchronous radio network, the RR 761 in the synchronous core network 760 informs that the handoff to the target asynchronous radio network will be generated.

At step S75, after receiving the 'Handoff Request' message from the RR 761 in the synchronous core network network 760, the target asynchronous radio network 770 is informed that the handoff will be generated; analyzes and stores information of the source asynchronous radio network 750 and the asynchronous mobile station 740, which are related to the handoff; and is prepared for the handoff. And then, in response to the received message, the target asynchronous radio network 770 transmits a 'Handoff Request Ack' message to the synchronous core network 760.

At step S76, after receiving the 'Handoff Request Ack' message from the target asynchronous radio network, the RR 761 in the synchronous core network 760 is informed that the target asynchronous radio network was prepared for the handoff, and transmits a 'Handoff Command' message to the source asynchronous radio network 750.

At step S77, after receiving the 'Handoff Command' message from the RR 761 in the synchronous core network 760, the source asynchronous radio network 750 transmits information of the target asynchronous radio network which is a target base station for the handoff through a 'Physical Channel Reconfiguration' message to the RRC 742 in the asynchronous mobile station 740.

At step S78, after receiving the 'Physical Channel Reconfiguration' message from the RRC in the source asynchronous radio network 750, the RRC in the asynchronous mobile station 740 is prepared for the handoff to the target asynchronous radio network 770. In response to the received message, the RRC 742 transmits a 'MS Ack Order' message to the RRC 751 in the source asynchronous radio network.

At step S79, after receiving the 'MS Ack Order' message, the RRC 751 in the source asynchronous radio network is informed that the asynchronous mobile station 740 commences the handoff, and transmits a 'Handoff Commenced' message to the RR 761 in the synchronous core network 760.

At step S80, the establishment of the radio link and the synchronization are performed for communication between the asynchronous mobile station 740 and the target asynchronous radio network 770.

At step S81, the RRC 742 in the asynchronous mobile station 740 transmits a 'RRC Connection Re-establishment Request' message to the target asynchronous radio network 770, in order to establish a Layer-3 signaling and use a Dedicated Control Channel (DCCH) between the target asynchronous radio network 770 and itself.

At step S82, after receiving the 'RRC Connection Re-establishment request' message, the target asynchronous radio network 770 transmits a 'RRC Connection Re-establishment' message to the RRC 742 in the asynchronous mobile station 740, in order to provide information of the Layer-3 signaling establishment and the DCCH to the asynchronous mobile station 740.

At step S83, after receiving the 'RRC Connection Re-establishment' message, the RRC 742 in the asynchronous mobile station 740 analyzes information contained in the message and then establishes the Layer-3 signaling and the DCCH between the target asynchronous radio network 770 and itself, and transmits a 'RRC Connection Re-establishment Complete' message to the RRC 771 in the target asynchronous radio network 770 in order to inform that establishment is completed.

At step S84, after completing the establishment of the radio link, synchronization and the establishment of the signaling for radio protocol between the target asynchronous radio network 770 and itself, the RRC 742 in the asynchronous mobile station 740 transmits a 'Physical Channel Reconfiguration' message to the RRC 771 in the target asynchronous radio network 770, in order to inform that handoff is completed.

At step S85, after receiving the 'Physical Channel Reconfiguration' message, the target asynchronous radio network 770 is informed that the handoff was completed, and transmits a 'Handoff Complete' message to the RR 761 in the synchronous core network in order to inform that the target asynchronous radio network 770 is communicating presently with the asynchronous mobile station.

At step S86, after receiving the 'Handoff Complete' message, the RR in the synchronous core network 760 informs the CC entity 762 that the handoff was completed, through an internal communication. After being informed, the CC entity 762 in the synchronous core network 760 transmits a 'Clear Command' message to the source asynchronous radio network 750 in order to release a radio resource and a wire resource of the source asynchronous radio network 750.

At step S87, after receiving the 'Clear Command' message, the RRC in the source asynchronous radio network is informed that the radio and the wire resource should be released, and transmits a 'Radio Bearer Release' message to the RRC 742 in the asynchronous mobile station 740 in order to release the radio resource.

At step S88, after receiving the 'Radio Bearer Release' message, the RRC 742 in the asynchronous mobile station 740 performs releasing the radio resource for exclusive use, and transmits the 'Radio Bearer Release' message containing information of completing the release, through the primitive of the 'IF Side Initiated Radio Access Bearer Release Indication' provided by the DC-SAP, to the CC entity 741 in the asynchronous mobile station 740.

At step S89, after receiving the 'Radio Bearer Release' message, the CC entity 741 in the asynchronous mobile station 740 is informed that the radio resource for exclusive use between the asynchronous mobile station 740 and the asynchronous radio network 750 was released, and in response to the received message, transmits the 'Radio Bearer Release Complete' message through the primitive of the 'IF Side Initiated Radio Access Bearer Release Indication' provided by the DC-SAP, to the RRC 742 in the asynchronous mobile station 740.

At step S90, after receiving the 'Radio Bearer Release Complete' message, the RRC 742 in the asynchronous mobile station 740 transmits the 'Radio Bearer Release Complete' message to the RRC 751 in the asynchronous radio network 750, in order to inform that the release of the radio resource for exclusive use between the asynchronous radio network and itself was completed.

At step S91, after receiving the 'Radio Bearer Release Complete' message, the RRC 751 in the asynchronous radio network 750 transmits the 'RRC Connection Release' message to the RRC 742 in the asynchronous mobile station, in order to release the Layer-3 signaling and the radio resource.

At step S92, after receiving the 'RRC Connection Release' message, the RRC 742 in the asynchronous mobile station 740 is informed that the Layer-3 signaling and the radio resource should be released between the asynchronous radio network 750 and itself; transmits the 'RRC Connection Release Complete' message to release the Layer-3 signaling and the radio resource, to the RRC 751 in the asynchronous radio network 750; and performs releasing the Layer-3 signaling and the radio resource.

At step S93, after receiving the 'Radio Connection Release Complete' message, the RRC 751 in the asynchronous radio network 750 is informed that the Layer-3 signaling and the radio resource for common use were released, and transmits a 'Clear Complete' message to the CC entity 762 in the synchronous core network 760, so that the CC entity can be informed that releasing of all resources and signaling is completed between the asynchronous mobile station 740 and itself.

Figure 11B:
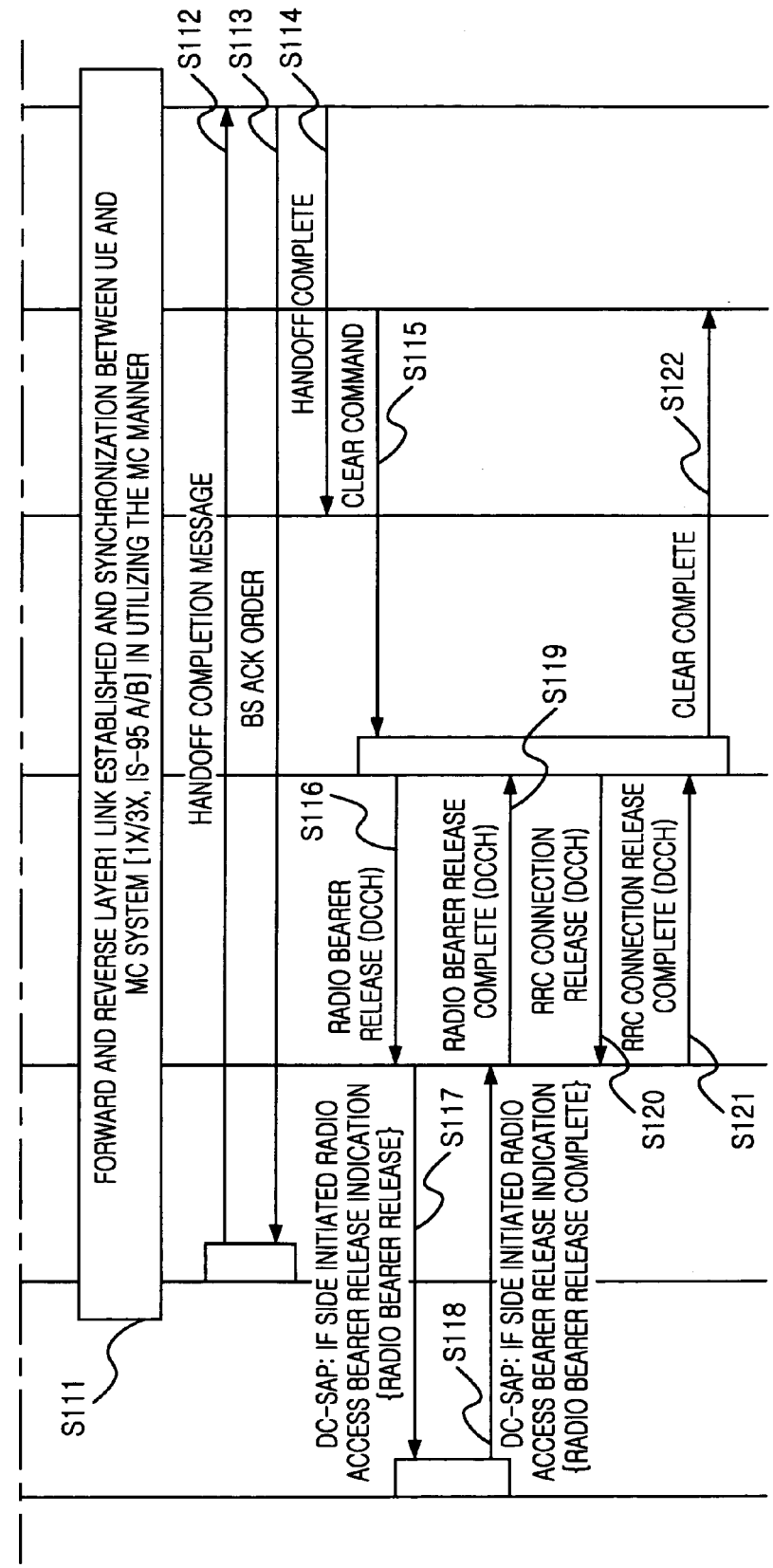

FIGS. 11A and 11B are flow charts representing a method for processing a handoff in the asynchronous mobile communication system in accordance with the present invention. Particularly, in this system, a synchronous core network is interlocked with a source asynchronous radio network and a target synchronous radio network.

Reference numerals 740, 741, 742 and 743 denote an asynchronous mobile station, a synchronous call control (CC) entity, an asynchronous radio resource controller (RRC) included in the asynchronous mobile station, and a synchronous radio resource (RR), respectively.

Reference numerals 750 and 751 denote a source asynchronous radio network, and an asynchronous radio resource controller (RRC) included in the source asynchronous radio network, respectively.

Reference numerals 760, 761 and 762 denote a synchronous ANSI-41 core network, a synchronous radio resource (RR) included in the synchronous core network, and a synchronous call control (CC) entity included in the synchronous core network, respectively.

Reference numeral 780 denotes a target synchronous radio network interlocked with the synchronous core network 760.

At step S101, the RRC 751 in the source asynchronous radio network provides information necessary for measuring performance and power of a radio link to the RRC 742 in the asynchronous mobile station 740. The asynchronous mobile station 740 measures the performance and the power of the radio link based on the information which is received from the source asynchronous radio network 750. Thus, for the step S101, the RRC in the asynchronous radio network transmits a 'Measurement Control' message to the RRC in the asynchronous mobile station.

At step S102, after receiving the 'Measurement Control' message, the asynchronous mobile station measures the performance and the power of the radio link based on the information contained in the received message, and transmits the result of measurement through a 'Measurement Report' message to the RRC 751 in the source asynchronous radio network 750. After receiving the 'Measurement Report' message, the RRC 751 in the source asynchronous radio network 750 determines, based on the information contained in the received message, whether a handoff is allowed.

If the handoff is allowed, at step S103, the source asynchronous radio network 750 transmits a 'Handoff Required' message for requesting a handoff to the RR 761 in the MSC of the synchronous core network. The 'Handoff Required' message includes information of a target MC system which is a target base station for the handoff.

At step S104, after receiving the 'Handoff Required' message from the RRC 751 in the source asynchronous radio network 750, the RR 761 in the synchronous core network 760 analyzes information contained in the received message, and grasps information of the target MC system which is a target base station for the handoff. Then, the RR 761 in the synchronous core network 760 transmits a 'Handoff Request' message to the target MC system, in order to inform that the handoff to the target MC system will be generated. In response to the 'Handoff Request' message, the target MC system determines whether it stores a resource to be assigned to the mobile station that requires the handoff.

At step S105, in case the target MC system stores the resource to be assigned, it assigns the proper resource and connects to a call of the mobile station that requires the handoff. The target MC system transmits a Null Forward Traffic Channel Frame to the mobile station that requires the handoff.

At step S106, the target MC system transmits a 'Handoff Request Ack' message to the RR 761 in the synchronous core network 760.

At step S107, after receiving the 'Handoff Request Ack' message, the RR 761 in the synchronous core network 760 is informed that the target MC system was prepared for the handoff, and transmits a 'Handoff Command' message to the RRC 751 in the source asynchronous radio network 750.

At step S108, after receiving the 'Handoff Command' message, the RRC in the source asynchronous radio network transmits information of the target MC system which is a target base station for the handoff through an 'Inter System Handover Command' message to the RRC 742 in the asynchronous mobile station 740.

At step S109, after receiving the 'Inter System Handover Command' message, the RRC 742 in the asynchronous mobile station 740 gets prepared for the handoff to the target MC system, and, in response to the received message, transmits a 'MS Ack Order' message to the RRC in the source asynchronous radio network.

At step S110, after receiving the 'MS Ack Order' message, the RRC 751 in the source asynchronous radio network 750 is informed that the asynchronous mobile station commenced the handoff, and transmits a 'Handoff Commenced' message to the RR 761 in the synchronous core network 760 in order to inform that the handoff was commenced.

At step S111, by transmitting a Reverse Traffic Channel Frame and a Traffic Channel Preamble to the target MC system, the asynchronous mobile station performs an establishment of the radio link and a synchronization for a communication between the target MC system and itself.

At step S112, after completing the establishment of the radio link, the synchronization and the establishment of Signaling for the radio protocol, the asynchronous mobile station 740 transmits a 'Handoff Completion Message' message to the target MC system in order to inform that the handoff was competed.

At step S113, after receiving the 'Handoff Completion Message' message, the target MC system, in response to the received message, transmits a 'BS Ack Order' message to the asynchronous mobile station 740.

At step S114, the target MC system is informed that the handoff was completed, transmits a 'Handoff Completed' message to the RR 761 in the synchronous core network 760 in order to inform that it is communicating with the present mobile station.

At step S115, after receiving the 'Handoff Complete' message, the RR 761 in the synchronous core network informs the CC entity in the MSC, through the internal communication, that the handoff was completed. After being informed, the CC entity in the synchronous core network transmits a 'Clear Command' message to the RRC 751 in the source asynchronous radio network 750 in order to release the radio resource and the wire resource between the source asynchronous radio network 750 and itself.

At step S116, after receiving the 'Clear Command' message, the RRC 751 in the source asynchronous radio network 750 is informed that the radio resource and the wire resource should be released, and transmits a 'Radio Bearer Release' message to the RRC 742 in the asynchronous mobile station 740 in order to release the radio resource.

At step S117, after receiving the 'Radio Bearer Release' message, the RRC in the asynchronous mobile station performs releasing the radio resource for exclusive use, and transmits the 'Radio Bearer Release' message containing information of completing the release, through the primitive of the 'IF Side Initiated Radio Access Bearer Release Indication' provided by the DC-SAP, to the CC entity 741 in the asynchronous mobile station 740.

At step S118, after receiving the 'Radio Bearer Release' message, the CC entity in the asynchronous mobile station is informed that the radio resource for exclusive use between the asynchronous mobile station and the source asynchronous radio—network was released, and in response to the received message, transmits the 'Radio Bearer Release Complete' message through the primitive of the 'IF Side Initiated Radio Access Bearer Release Indication' provided by the DC-SAP, to the RRC 742 in the asynchronous mobile station 740.

At step S119, after receiving the 'Radio Bearer Release Complete' message, the RRC 742 in the asynchronous mobile station 740 transmits the 'Radio Bearer Release Complete' message to the RRC 751 in the source asynchronous radio network 750, in order to inform that releasing the radio resource for exclusive use between the source asynchronous radio network 750 and itself was completed.

At step S120, after receiving the 'Radio Bearer Release Complete' message, the RRC 751 in the source asynchronous radio network 750 transmits the 'RRC Connection Release' message to the RRC 742 in the asynchronous mobile station 740, in order to release the Layer-3 signaling and the radio resource.

At step S121, after receiving the 'RRC Connection Release' message, the RRC 742 in the asynchronous mobile station 740 is informed that the Layer-3 signaling and the radio resource should be released between the source asynchronous radio network 750 and itself; transmits the 'RRC Connection Release Complete' message to release the Layer-3 signaling and the radio resource, to the RRC 751 in the source asynchronous radio network 750; and performs releasing the Layer-3 signaling and the radio resource.

At step S122, after receiving the 'RRC Connection Release Complete' message, the RRC 751 in the source asynchronous radio network 750 is informed that the Layer-3 signaling and the radio resource were released, and transmits a 'Clear Complete' message to the CC entity 762 in the synchronous core network, so that the CC entity can be informed that releasing of all resources and signaling is completed between the asynchronous mobile station 740 and itself.

Figure 12B:
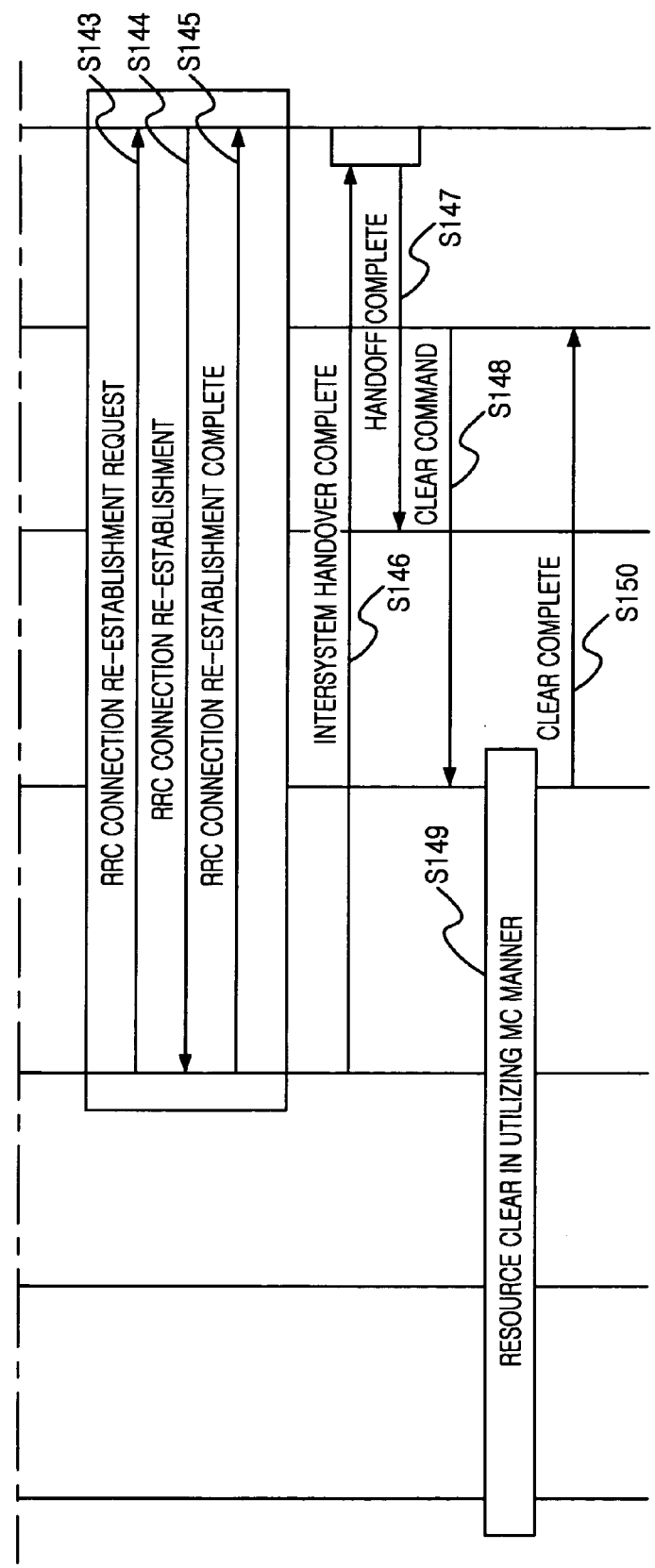

FIGS. 12A and 12B are flow charts representing a method for processing a handoff in the asynchronous mobile communication system. Particularly, in this system, a synchronous core network is interlocked with a source synchronous radio network and a target asynchronous radio network.

Reference numerals 810, 811, 812 and 813 denote a synchronous mobile station, a synchronous call control (CC) entity, an asynchronous radio resource controller (RRC) included in the synchronous mobile station 810 and a synchronous radio resource (RR), respectively.

A reference numeral 800 denotes a synchronous radio network.

Reference numerals 760, 761 and 762 denote a synchronous ANSI-41 core network, a synchronous radio resource (RR) included in the synchronous core network 760, and a synchronous call control (CC) entity included in the synchronous core network 760, respectively.

Reference numerals 790 and 791 denote a target asynchronous radio network, and an asynchronous radio resource controller (RRC) included in the asynchronous radio network 790, respectively.

At step S131, a source MC system 800 transmits a 'Candidate Frequency Search Request' message requesting to measure a neighboring radio link to the RR 813 in the synchronous mobile station 810. The neighboring radio link represents a radio link that is not used presently, but can be used for the handoff.

At step S132, after receiving the 'Candidate Frequency Search Request' message, the RR 813 in the synchronous mobile station 810 is informed that the neighboring radio link should be measured, and in response to the received message, transmits a 'Candidate Frequency Search Response' message to the source MC system 800.

At step S133, after receiving the 'Candidate Frequency Search Response' message, the source MC system 800 transmits information about the neighboring radio link and information related to the measurement including a measurement scope and a measurement cycle, through a 'Candidate Frequency Control' message, to the RR 813 in the synchronous mobile station 810. The mobile station is required to measure the above information.

At step S134, after receiving the 'Candidate Frequency Control' message, the RR 813 in the synchronous mobile station 810 stores information contained in the received message, and after measuring information about the neighboring radio link according to the stored information, transmits the result of measurement through a 'Candidate Frequency Search Report' message to the source MC system 800. The source MC system 800, based on the result contained in the received message, determines whether the handoff is allowed.

If the handoff is allowed, at step S135, the source MC system 800 transmits a 'Handoff Required' message requesting the handoff, to the RR 761 in the synchronous core network 760. The 'Handoff Required' message contains information of the target DS RNC. The target DS RNC means the target asynchronous radio network.

At step S136, after receiving the 'Handoff Required' message, the RR 761 in the synchronous core network is informed that the source MC system 800 requests a handoff, and analyzes and grasps information contained in the received message. Then, the RR 761 transmits a 'Handoff Request' message to the target DS RNC 790, in order to inform that the handoff to the target DS RNC will be generated.

After receiving the 'Handoff Request' message, the target DS RNC 790 is informed that the handoff will be generated; analyzes and stores information about the mobile station and the source MC system wherein the handoff will be generated; and determines whether it stores a resource to be assigned to the mobile station where the handoff will be generated.

If the target DS RNC 790 does store the resource to be assigned to the mobile station 810, at step S137, it transmits a 'Handoff Request Ack' message to the RR 761 in the synchronous core network, in response to the received 'Handoff Request' message.

At step S138, after receiving the 'Handoff Request Ack' message, the RR 761 in the synchronous core network 800 is informed that the target DS RNC 790 was prepared for the handoff, and transmits a 'Handoff Command' message requesting the handoff to the source MC system 800.

At step S139, after receiving the 'Handoff Command' message, the source MC system 800 transmits an Extended Handoff Direction Message or a General Handoff Direction Message requesting the handoff, to the RR 813 in the mobile station 810.

At step S140, after receiving the Extended Handoff Direction Message or the General Handoff Direction Message, the RR 813 in the mobile station 810 gets prepared for the handoff to the target DS RNC 790, and in response to the received message, transmits a 'MS Ack Order' message to the source MC system 800.

At step S141, after receiving the 'MS Ack Order' message, the source MC system 800 is informed that the mobile station 810 commenced the handoff, and transmits a 'Handoff Commenced' message to the RR 761 in the synchronous core network 760 in order to inform that the handoff was commenced.

At step S142, an establishment of the radio link and a synchronization are performed for communication between the mobile station 810 and the target DS RNC 790.

At step S143, the RRC 812 in the mobile station 810 transmits a 'RRC Connection Re-establishment Request' message to the target DS RNC, in order to establish a Layer-3 signaling and use a Dedicated Control Channel (DCCH) between the target DS RNC 790 and itself.

At step S144, after receiving the 'RRC Connection Re-establishment Request' message, the target DS RNC transmits a 'RRC Connection Re-establishment' message to the RRC in the mobile station 810, in order to provide information of the Layer-3 signaling establishment and the DCCH to the mobile station 810.

At step S145, after receiving the 'RRC Connection Re-establishment' message, the RRC 812 in the mobile station 810 analyzes information contained in the received message and then establishes the Layer-3 signaling and the DCCH between the target DS RNC 790 and itself, and transmits a 'RRC Connection Re-establishment Complete' message to the RRC 791 in the target DS RNC 790 in order to inform that the establishment is completed.

At step S146, after completing the establishment of the radio link, the synchronization and the establishment of the signaling for the radio protocol between the target DS RNC 790 and itself, the RRC 812 in the mobile station 810 transmits a 'Intersystem Handover Complete' message to the RRC 791 in the target DS RNC 790, in order to inform that the handoff is completed.

At step S147, after receiving the 'Intersystem Handover Complete' message, the target DS RNC 790 is informed that the handoff was completed, and transmits a 'Handoff Complete' message to the RR 761 in the synchronous core network 760 in order to inform that it is communicating presently with the mobile station.

At step S148, after receiving the 'Handoff Complete' message, the RR 761 in the synchronous core network 760 informs the CC entity 762 in the synchronous core network 760 that the handoff was completed, through an internal communication. After being informed, the CC entity in the synchronous core network 760 transmits a 'Clear Command' message to the source MC system 800 in order to release a radio resource and a wire resource of the source MC system 800.

At step S149, after receiving the 'Clear Command' message, the source MC system 800 releases all resources and the signaling that were established between the mobile station 810 and itself.

At step S150, after releasing all resources and signaling, the source MC system 800 transmits a 'Clear Complete' message to the CC entity 762 in the synchronous core network 760 in order to inform that all sources and signaling were released between the mobile station 810 and itself.

Figure 13B:
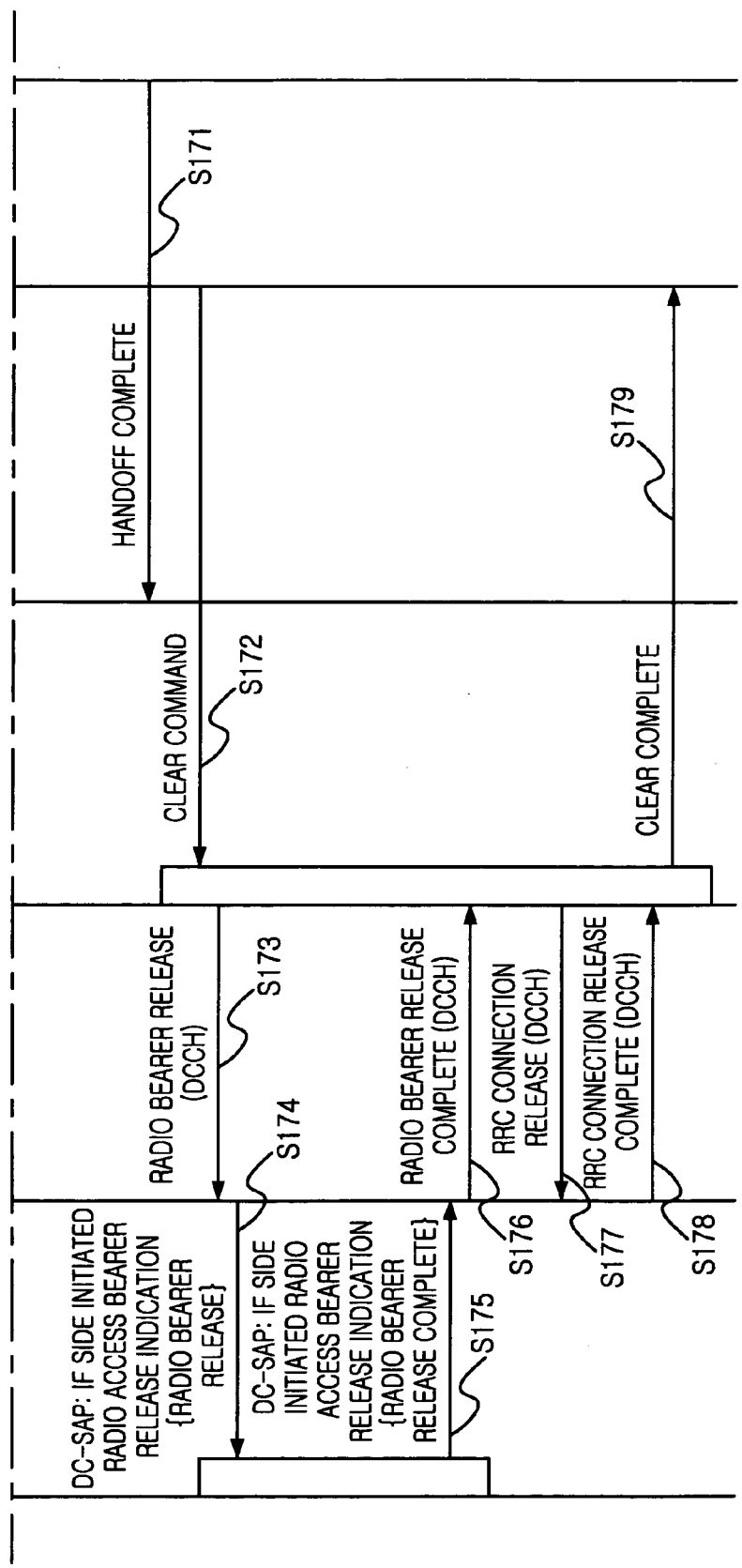

FIGS. 13A and 13B are flow charts representing a method for processing a handoff in the asynchronous mobile communication system in accordance with the present invention. Particularly, in this system, a synchronous core network is interlocked with a source asynchronous radio network and an analog radio network.

Reference numerals 810, 811 and 812 denote a synchronous mobile station, a synchronous call control (CC) entity, and an asynchronous radio resource controller (RRC) included in the synchronous mobile station, respectively.

Reference numerals 820 and 821 denote an asynchronous radio network of asynchronous communication mode, and a RRC included in the asynchronous radio network, respectively.

Reference numerals 760, 761 and 762 denote a synchronous ANSI-41 core network, a synchronous radio resource (RR) included in the synchronous core network, and a synchronous call control (CC) entity included in the synchronous core network, respectively.

A reference numeral 830 denotes an analog radio network.

At step S161, the RRC 821 in the source DS RNC 820 provides information for measuring performance and power of a radio link to the RRC 812 in the mobile station 810. The source DS RNC means the source asynchronous radio network. The mobile station 810 measures the radio link based on this information. Thus, the RRC in the source DS RNC 820 transmits a 'Measurement Control' message to the RRC 812 in the mobile station 810.

At step S162, after receiving the 'Measurement Control' message, the mobile station measures performance and power of the radio link based on information contained in the received message, and transmits the result of the measurement through a 'Measurement Report' message to the RRC 821 in the source DS RNC 820. After receiving the 'Measurement Report' message, the RRC in the source DS RNC determines, based on the information contained in the received message, whether a handoff is allowed.

If the handoff is allowed, at step S163, the source DS RNC 820 transmits a 'Handoff Required' message for requesting a handoff to the RR 761 in the synchronous core network. The 'Handoff Required' message includes information of a target analog system which is a target base station for the handoff.

At step S164, after receiving the 'Handoff Required' message, the RR 761 in the synchronous core network 760 analyzes information contained in the received message, and grasps information of the target analog system for the handoff. Then, the RR 761 in the synchronous core network 760 transmits a 'Handoff Request' message to the target analog system, in order to inform that the handoff to the target analog system will be generated.

After receiving the 'Handoff Request' message, the target analog system 830 is informed that the handoff will be generated; analyzes and stores information about the mobile station 810 and the source DS RNC 820 wherein handoff will be generated; and determines whether it stores a resource to be assigned to the mobile station where handoff will be generated.

In cases where the target analog system stores the resource to be assigned to the mobile station 810, at step S165, it transmits a 'Handoff Request Ack' message to the RR 761 in the synchronous core network 760, in response to the received 'Handoff Request' message.

At step S166, after receiving the 'Handoff Request Ack' message, the RR 761 in the synchronous core network 760 is informed that the target analog system was prepared for the handoff, and transmits a 'Handoff Command' message requesting handoff to the source DS RNC 820.

At step S167, after receiving the 'Handoff Command' message, the source DS RNC transmits information of the target analog system for the handoff through an 'Inter System Handover Command' message to the RRC 812 in the mobile station 810.

At step S168, after receiving the 'Inter System Handover Command' message, the RRC 812 in the mobile station 810 gets prepared for the handoff to the target analog system, and, in response to the received message, transmits an 'MS Ack Order' message to the RRC 821 in the source DS RNC 820.

At step S169, after receiving the 'MS Order' message, the RRC 821 in the source DS RNC 820 is informed that the mobile station 810 commenced the handoff, and transmits a 'Handoff Commenced' message to the RR 761 in the synchronous core network 760 in order to inform that the handoff was commenced.

At step S170, the radio link is established, a vocoder is initialized, and a mutual signaling is exchanged for a communication between the mobile station 810 and the target analog system 830.

At step S171, after the process at the step S170 was completed, the target analog system 830 is informed that the handoff was completed, transmits a 'Handoff Complete' message to the RR 761 in the synchronous core network 760 in order to inform that it is communicating with the mobile station.

At step S172, after receiving the 'Handoff Complete' message, the RR 761 in the synchronous core network 760 informs the CC entity 762, through internal communication, that the handoff was completed. After being informed, the CC entity in the synchronous core network 760 transmits a 'Clear Command' message to the source DS RNC 820 in order to release the radio resource and the wire resource between the source DS RNC 820 and itself.

At step S173, after receiving the 'Clear Command' message, the RRC 821 in the source DS RNC 820 is informed that the radio resource and the wire resource should be released, and transmits a 'Radio Bearer Release' message to the RRC 812 of the mobile station in order to release the radio resource.

At step S174, after receiving the 'Radio Bearer Release' message, the RRC in the mobile station 810 performs releasing the radio resource for exclusive use, and transmits the 'Radio Bearer Release' message containing information of completing the release, through the primitive of the 'IF Side Initiated Radio Access Bearer Release Indication' provided by the DC-SAP, to the CC entity 811 in the mobile station 810.

At step S175, after receiving the 'Radio Bearer Release' message, the CC entity 811 in the mobile station 810 is 1—15 informed that the radio resource for exclusive use between the mobile station 810 and the source DS RNC 820 was released, and in response to the received message, transmits the 'Radio Bearer Release Complete' message through the primitive of the 'IF Side Initiated Radio Access Bearer Release Indication' provided by the DC-SAP, to the RRC 812 in the mobile station 810.

At step S176, after receiving the 'Radio Bearer Release Complete' message, the RRC in the mobile station transmits the 'Radio Bearer Release Complete' message to the RRC 821 in the source DS RNC 820, in order to inform that releasing the radio resource for exclusive use between the source DS RNC 820 and itself was completed.

At step S177, after receiving the 'Radio Bearer Release Complete' message, the RRC in the source DS RNC 820 transmits the 'RRC Connection Release' message to the RRC in the mobile station 810, in order to release the Layer-3 signaling and the radio resource for common use.

At step S178, after receiving the 'RRC Connection Release' message, the RRC in the mobile station 810 is informed that the Layer-3 signaling and the radio resource for common use should be released between the source DS RNC 820 and it; transmits the 'RRC Connection Release Complete' message to release the Layer-3 signaling and the radio resource for common use, to the RRC 821 in the source DS RNC 820; and performs releasing the Layer-3 signaling and the radio resource for common use.

At step S179, after receiving the 'RRC Connection Release Complete' message, the source DS RNC is informed that the Layer-3 signaling and the radio resource for common use were released, and transmits a 'Clear Complete' message to the CC entity 762 in the synchronous core network 760, so that the CC entity 762 can be informed that releasing of all resources and signaling is completed between the mobile station 810 and it.

As can be seen from above, by performing the embodiments in accordance with the present invention, there are provided benefits that it is possible to process a call and a handoff well, even if a core network is connected to any one of a GSM-MAP network and an ANSI-41 network; and it is possible for a subscriber to an asynchronous mobile communication system to have a phone call with a subscriber to a synchronous ANSI-41 network or the other networks.

Although the preferred embodiments of the invention have been disclosed for illustrative purpose, those skilled in the art will appreciate that various modifications, additions, and substitutions are possible, without departing from the scope and sprit of the invention as disclosed in the accompanying claims.

What is claimed is:

1. A method for processing a call in an asynchronous mobile communication system, wherein an asynchronous mobile station includes a call control (CC) entity, a mobility management (MM) entity and a radio resource controller (RRC); an asynchronous radio network includes a radio resource controller (RRC); and a synchronous core network is interlocked, the method comprising the steps of:
   a) setting up the call in case a calling call message is generated in the mobile station;
   b) establishing a channel between the asynchronous mobile station and the asynchronous radio network;
   c) handling basic information for assigning a radio resource;
   d) performing a cipher establishment;
   e) establishing the radio resource;
   f) performing a configuration for a service; and
   g) transmitting a phone call stand-by message to a user,
   wherein the step a) includes the steps of:
   a1) transmitting the calling call message generated in the CC entity of the asynchronous mobile station, to the RRC of the asynchronous mobile station;
   a2) requesting the RRC of the asynchronous radio network of a connection, through a common control channel (CCCH); and
   a3) transmitting a connection completion message and information of a dedicated control channel (DCCH), through the CCCH, to the asynchronous mobile station, after receiving the request of the connection,
   wherein the step b) includes the steps of:
   b1) establishing the DCCH that the asynchronous mobile station is required to use, based on the information of the DCCH received from the asynchronous radio network;
   b2) transmitting information of the asynchronous mobile station capability, through the DCCH, to the asynchronous radio network;
   b3) receiving a confirmation response of the information of the asynchronous mobile station capability from the asynchronous radio network; and
   b4) transmitting the calling call message, through the DCCH, to the asynchronous radio network.

2. The method as recited in claim 1, wherein the step c) includes the steps of:
   c1) storing a necessary message from the calling call message in the asynchronous radio network;
   c2) transmitting a message representing that the calling call is generated to the synchronous core network;

c3) transmitting information of a wire resource assignment and information of a radio resource assignment from the synchronous core network to the asynchronous radio network;
c4) establishing the wire resource in the asynchronous radio network; and
c5) transmitting the basic information for assigning the radio resource to the asynchronous mobile station.

3. The method as recited in claim 2, wherein the step d) includes the steps of:
d1) selecting information of ciphering from the basic information for assigning the radio resource and storing the information of ciphering in the asynchronous mobile station; and
d2) transmitting a ciphering completion message to the asynchronous radio network.

4. The method as recited in claim 3, wherein the step e) includes the steps of:
e1) after receiving the ciphering completion message, transmitting basic information of the radio resource for establishing the radio resource to the asynchronous mobile station;
e2) storing the basic information of the radio resource in the asynchronous mobile station;
e3) establishing the radio resource, based on the stored information; and
e4) transmitting a radio resource establishment completion message to the asynchronous radio network.

5. The method as recited in claim 4, wherein the step f) includes the steps of:
f1) after receiving the radio resource establishment completion message, transmitting information of a service configuration to the asynchronous mobile station;
f2) storing the information of the service configuration in the asynchronous mobile station; and
f3) completing the service configuration and then transmitting a service connect completion message to the asynchronous radio network.

6. The method as recited in claim 5, wherein the step g) includes the steps of:
after receiving the service connect completion message, transmitting the radio resource establishment completion message to the synchronous core network; and if the phone call stand-by message is received, transmitting the phone call stand-by message to the asynchronous mobile station.

7. A method for processing a handoff in an asynchronous mobile communication system including an asynchronous mobile station having a call control (CC) entity and a radio resource controller (RRC), a source asynchronous radio network having a radio resource controller (RRC), and at least one target asynchronous radio network having a radio resource controller (RRC), wherein a synchronous core network is interlocked, the method comprising the steps of:
a) determining to handoff;
b) selecting the target asynchronous radio network for the handoff;
c) in response to a handoff request, providing information related to the handoff, thereby completing a preparation for the handoff;
d) establishing a connection between the asynchronous mobile station and the target asynchronous radio network, thereby completing the handoff; and
e) disconnecting the communication between the asynchronous mobile station and the source asynchronous radio network, wherein the step a) includes the steps of:
a1) at the asynchronous mobile station, measuring a power and a performance of a radio link, based on information related to a radio link measurement received from the source asynchronous radio network;
a2) transmitting a radio link measurement report message to the source asynchronous radio network; and
a3) at the source asynchronous radio network, determining whether the handoff is allowed, based on the radio link measurement report message,
wherein the step b) includes the steps of:
b1) transmitting a handoff required message to the synchronous core network, if it is determined to handoff; and
b2) at the synchronous core network, grasping information about the target asynchronous radio network by analyzing the handoff required message,
wherein the step c) includes the steps of:
c1) at the synchronous core network, transmitting a handoff request message to the target asynchronous radio network;
c2) at the target asynchronous radio network, analyzing and storing information about the source asynchronous radio network and the asynchronous mobile station, based on the handoff request message;
c3) transmitting a handoff request acknowledgement message from the target asynchronous radio network to the synchronous core network, transmitting a handoff command message from the synchronous core network to the source asynchronous radio network, and transmitting a physical channel reconfiguration RRC message from the source asynchronous radio network to the asynchronous mobile station;
c4) transmitting a message for informing that the mobile station is prepared for the handoff, from the asynchronous mobile station to the source asynchronous radio network; and
c5) transmitting a handoff commenced message from the source asynchronous radio network to the synchronous core network.

8. The method as recited in claim 7, wherein the physical channel reconfiguration RRC message further contains the information about the target asynchronous radio network.

9. The method as recited in claim 7, wherein the step d) includes the steps of:
d1) performing a radio link establishment and a synchronization for the communication between the asynchronous mobile station and the target asynchronous radio network; and
d2) establishing a layer-3 signaling and a dedicated control channel (DCCH) between the asynchronous mobile station and the target asynchronous radio network.

10. The method as recited in claim 9, wherein the step e) includes the steps of:
e1) after receiving a message informing that the handoff is completed from the asynchronous mobile station, transmitting a handoff complete message from the target asynchronous radio network to the synchronous core network;
e2) transmitting a clear command message for releasing a wire resource and a radio resource of the source asynchronous radio network from the synchronous core network to the source asynchronous radio network;
e3) transmitting a message for informing that the radio resource should be released, from the source asynchronous radio network to the asynchronous mobile station;

e4) after, at the asynchronous mobile station, releasing a radio resource for an exclusive use, transmitting a radio resource release completion message, from the asynchronous mobile station to the source asynchronous radio network;

e5) at the asynchronous mobile station, releasing the layer-3 signaling and a radio resource for a common use, after receiving a radio resource controller connection release message from the source asynchronous radio network;

e6) transmitting a radio resource controller connection release complete message from the asynchronous mobile station to the source asynchronous radio network; and e7) transmitting a clear complete message for informing that it is completed to release a connection between the asynchronous mobile station and the source asynchronous radio network, from the source asynchronous radio network to the synchronous core network.

11. A method for processing a handoff in an asynchronous mobile communication system including an asynchronous mobile station and a source asynchronous radio network, wherein a synchronous core network and at least one target synchronous radio network are interlocked, the method comprising the steps of:

a) determining to handoff;

b) selecting the target synchronous radio network for the handoff;

c) in response to a handoff request, providing information related to the handoff, thereby completing a preparation for the handoff;

d) establishing a connection between the asynchronous mobile station and the target synchronous radio network, thereby completing the handoff; and e) disconnecting the communication between the asynchronous mobile station and the source asynchronous radio network, wherein the step a) includes the steps of:

a1) at the asynchronous mobile station, measuring a power and a performance of a radio link, based on information related to the radio link measurement received from the source asynchronous radio network;

a2) transmitting a radio link measurement report message to the source asynchronous radio network; and a3) at the source asynchronous radio network, determining whether the handoff is allowed, based on the radio link measurement report message, wherein the step b) includes the steps of:

b1) transmitting a handoff required message to the synchronous core network, if it is determined to handoff; and b2) at the synchronous core network, grasping information about the target synchronous radio network by analyzing the handoff required message, wherein the step c) includes the steps of:

c1) at the synchronous core network, transmitting a handoff request message to the target synchronous radio network;

c2) at the target synchronous radio network, analyzing and storing information about the source asynchronous radio network and the asynchronous mobile station, based on the handoff request message;

c3) at the target synchronous radio network, assigning resources to the asynchronous mobile station, thereby connecting to the call of the asynchronous mobile station;

c4) at the target synchronous radio network, transmitting a null forward traffic channel frame to the asynchronous mobile station;

c5) transmitting a handoff request acknowledgement message from the target synchronous radio network to the synchronous core network, transmitting a handoff command message from the synchronous core network to the source asynchronous radio network, and transmitting an intersystem handover request RRC message from the source asynchronous radio network to the asynchronous mobile station;

c6) transmitting a message for informing that the mobile station is prepared for the handoff, from the asynchronous mobile station to the source asynchronous radio network; and c7) transmitting a handoff commenced message from the source asynchronous radio network to the synchronous core network.

12. The method as recited in claim 11, wherein the intersystem handover request RRC message further contains the information about the target synchronous radio network.

13. The method as recited in claim 11, wherein the step d) includes the steps of:

d1) at the asynchronous mobile station, transmitting a reverse traffic channel frame and a traffic channel preamble to the target synchronous radio network; and d2) performing a radio link establishment and a synchronization for the communication between the asynchronous mobile station and the target synchronous radio network.

14. The method as recited in claim 13, wherein the step e) includes the steps of:

e1) after receiving a message informing that the handoff is completed from the asynchronous mobile station, transmitting a handoff complete message from the target synchronous radio network to the synchronous core network;

e2) transmitting a clear command message in order to release a wire resource and a radio resource of the source asynchronous radio network from the synchronous core network to the source asynchronous radio network;

e3) transmitting a message for informing that the radio resource should be released, from the source asynchronous radio network to the asynchronous mobile station;

e4) after, at the asynchronous mobile station, releasing a radio resource for an exclusive use, transmitting a radio resource release completion message, from the asynchronous mobile station to the source asynchronous radio network;

e5) at the asynchronous mobile station, releasing the layer-3 signaling and a radio resource for a common use, after receiving a radio resource controller connection release message from the source asynchronous radio network;

e6) transmitting a radio resource controller connection release complete message from the asynchronous mobile station to the source asynchronous radio network; and e7) from the source asynchronous radio network to the synchronous core network, transmitting a clear complete message for informing that it is completed to release a connection between the asynchronous mobile station and the source asynchronous radio network.

15. A method for processing a handoff in a synchronous mobile communication system including a synchronous mobile station and a source synchronous radio network, wherein a synchronous core network and at least one target asynchronous radio network are interlocked, the method comprising the steps of:
- a) determining to handoff;
- b) selecting a target asynchronous radio network for the handoff;
- c) in response to a handoff request, providing information related to the handoff, thereby completing a preparation for the handoff;
- d) establishing a connection between the synchronous mobile station and the target asynchronous radio network, thereby completing the handoff; and
- e) disconnecting the communication between the synchronous mobile station and the source synchronous radio network, wherein the step a) includes the steps of:
- a1) transmitting a message for requesting to measure a neighboring radio link, from the source synchronous radio network to the synchronous mobile station;
- a2) at the synchronous mobile station, measuring a power and a performance of the neighboring radio link, based on information related to a neighboring radio link measurement received from the source synchronous radio network;
- a3) transmitting a neighboring radio link measurement message to the source synchronous radio network; and
- a4) at the source synchronous radio network, determining whether the handoff is allowed, based on the neighboring radio link measurement message, wherein the step b) includes the steps of:
- b1) transmitting a handoff required message to the synchronous core network, if it is determined to handoff; and
- b2) at the synchronous core network, grasping information about the target asynchronous radio network by analyzing the handoff required message, wherein the step c) includes the steps of:
- c1) at the synchronous core network, transmitting a handoff request message to the target asynchronous radio network;
- c2) at the target asynchronous radio network, analyzing and storing information about the source synchronous radio network and the synchronous mobile station, based on the handoff request message;
- c3) transmitting a handoff request acknowledgement message from the target asynchronous radio network to the synchronous core network, transmitting a handoff command message from the synchronous core network to the source synchronous radio network, and transmitting an extended handoff direction message or a general handoff direction message for requesting the handoff, from the source synchronous radio network to the synchronous mobile station;
- c4) transmitting a message for informing that the mobile station is prepared for the handoff, from the synchronous mobile station to the source synchronous radio network; and
- c5) transmitting a handoff commenced message from the source synchronous radio network to the synchronous core network.

16. The method as recited in claim 15, wherein the step d) includes the steps of:
- d1) performing a radio link establishment and a synchronization for the communication between the synchronous mobile station and the target asynchronous radio network; and
- d2) establishing a layer-3 signaling and the DCCH between the asynchronous mobile station and the target asynchronous radio network.

17. The method as recited in claim 16, wherein the step e) includes the steps of:
- e1) after receiving a message informing that the handoff is completed, from the synchronous mobile station, transmitting a handoff complete message from the target asynchronous radio network to the synchronous core network;
- e2) transmitting a clear command message for releasing a wire resource and a radio resource of the source synchronous radio network, from the synchronous core network to the source synchronous radio network;
- e3) releasing all resources and signaling between the synchronous mobile station and the source synchronous radio network; and
- e4) from the source synchronous radio network to the synchronous core network, transmitting a clear complete message for informing that it is completed to release a connection between the synchronous mobile station and the source synchronous radio network.

18. A method for processing a handoff in an asynchronous mobile communication system including an asynchronous mobile station and a source asynchronous radio network and, wherein a synchronous core network and at least one target analog radio network are interlocked, the method comprising the steps of:
- a) determining to handoff;
- b) selecting the target analog radio network for the handoff;
- c) in response to a handoff request, providing information related to the handoff, thereby completing a preparation for the handoff;
- d) establishing a connection between the asynchronous mobile station and the target analog radio network, thereby completing the handoff; and
- e) disconnecting the communication between the asynchronous mobile station and the source asynchronous radio network, wherein the step a) includes the steps of:
- a1) at the asynchronous mobile station, measuring a power and a performance of a radio link, based on information related to the radio link measurement received from the source asynchronous radio network;
- a2) transmitting a radio link measurement report message to the source asynchronous radio network; and
- a3) at the source asynchronous radio network, determining whether the handoff is allowed, based on the radio link measurement report message, wherein the step b) includes the steps of:
- b1) transmitting a handoff required message to the synchronous core network, if it is determined to handoff; and
- b2) at the synchronous core network, grasping information about the target analog radio network by analyzing the handoff required message, wherein the step c) includes the steps of:
- c1) at the synchronous core network, transmitting a handoff request message to the target analog radio network;
- c2) at the target analog radio network, analyzing and storing information about the source asynchronous radio network and the asynchronous mobile station, based on the handoff request message;
- c3) transmitting a handoff request acknowledgement message from the target analog radio network to the synchronous core network, if in case the target analog radio network has a resource source to assign to the asynchronous mobile station and transmitting a handoff command message from the synchronous core network to the source asynchronous radio network;

c4) transmitting an inter system handoff command RRC message from the source asynchronous radio network to the asynchronous mobile station;

c5) transmitting a message for informing that the mobile station is prepared for the handoff, from the asynchronous mobile station to the source asynchronous radio network; and c6) transmitting a handoff commenced message from the source asynchronous radio network to the synchronous core network.

19. The method as recited in claim 18, wherein the inter system handoff command RRC message further contains the information about the target analog radio network.

20. The method as recited in claim 18, wherein the step d) includes the step of:

performing a radio link establishment, an initialization of a vocoder and exchanging a signaling between the asynchronous mobile station and the target analog radio network.

21. The method as recited in claim 20, wherein the step e) includes the steps of:

e1) transmitting a handoff complete message from the target analog radio network to the synchronous core network;

e2) transmitting a clear command message for releasing a wire resource and a radio resource of the source asynchronous radio network from the synchronous core network to the source asynchronous radio network;

e3) transmitting a message for informing that the radio resource should be released, from the source asynchronous radio network to the asynchronous mobile station;

e4) after, at the asynchronous mobile station, releasing a radio resource for an exclusive use, transmitting a radio resource release completion message, from the asynchronous mobile station to the source asynchronous radio network;

e5) at the asynchronous mobile station, releasing the layer-3 signaling and a radio resource for a common use, after receiving a radio resource controller connection release message from the source asynchronous radio network;

e6) transmitting a radio resource controller connection release complete message from the asynchronous mobile station to the source asynchronous radio network; and e7) transmitting a clear complete message for informing that it is completed to release a connection between the asynchronous mobile station and the source asynchronous radio network, from the source asynchronous radio network to the synchronous core network.

* * * * *